(12) United States Patent
Ito et al.

(10) Patent No.: US 8,974,674 B2
(45) Date of Patent: Mar. 10, 2015

(54) METHOD FOR PRODUCING AMMONIUM TUNGSTATE AQUEOUS SOLUTION

(75) Inventors: Hideaki Ito, Nagoya (JP); Takeshi Itakura, Nagoya (JP); Yoshiharu Yamamoto, Toyama (JP); Kazuo Sasaya, Toyama (JP); Takuya Okuno, Itami (JP); Fumiatsu Sato, Itami (JP); Syunsuke Yamanaka, Itami (JP); Akihiko Ikegaya, Itami (JP)

(73) Assignees: National University Corporation Nagoya University, Nagoya-shi (JP); A.L.M.T. Corp., Tokyo (JP); Sumitomo Electric Hardmetal Corp., Itami-shi (JP); Sumitomo Electric Industries, Ltd., Osaki-shi (JP)

( * ) Notice: Subject to any disclaimer, the term of this patent is extended or adjusted under 35 U.S.C. 154(b) by 55 days.

(21) Appl. No.: 13/582,644

(22) PCT Filed: Mar. 5, 2010

(86) PCT No.: PCT/JP2010/053659
§ 371 (c)(1),
(2), (4) Date: Sep. 4, 2012

(87) PCT Pub. No.: WO2011/108112
PCT Pub. Date: Sep. 9, 2011

(65) Prior Publication Data
US 2012/0328506 A1 Dec. 27, 2012

(51) Int. Cl.
*C01G 41/00* (2006.01)
*B01J 49/00* (2006.01)
*C02F 1/42* (2006.01)

(52) U.S. Cl.
CPC .............. *C01G 41/00* (2013.01); *C01P 2006/80* (2013.01)
USPC ........... 210/670; 210/660; 210/665; 210/672; 210/688; 423/54; 423/606; 423/56

(58) Field of Classification Search
CPC ...... C01G 41/003; C01G 39/003; C02F 1/42; C02F 2001/42; C22B 34/36
USPC .............. 432/54, 56, 606; 210/660, 665, 669, 210/670, 672, 688
See application file for complete search history.

(56) References Cited

U.S. PATENT DOCUMENTS

| 3,857,928 | A | | 12/1974 | Kim et al. |
| 3,936,362 | A | | 2/1976 | Vanderpool et al. |
| 4,514,369 | A | | 4/1985 | Hubred et al. |
| 5,891,407 | A | | 4/1999 | Gutknecht et al. |
| 6,113,868 | A | * | 9/2000 | Mathy et al. ........... 423/54 |

FOREIGN PATENT DOCUMENTS

| CN | 1037692 | A | | 12/1989 |
| CN | 1016158 | | | 4/1992 |
| CN | 1187802 | A | | 7/1998 |
| CN | 1071716 | C | | 9/2001 |
| CN | 1865463 | | * | 11/2006 |
| CN | 101113062 | A | | 1/2008 |
| CN | 101570346 | A | | 11/2009 |
| JP | 53-033979 | A | | 3/1978 |
| JP | 61-161140 | | | 7/1986 |
| JP | 63-307121 | | | 12/1988 |
| JP | 7-081940 | | | 3/1995 |
| JP | 11-130762 | | | 5/1999 |
| JP | 2000-514030 | | | 10/2000 |
| JP | 2001-233616 | | | 8/2001 |
| JP | 2004-067395 | | | 3/2004 |
| JP | 2008-150251 | | | 7/2008 |
| JP | 2008150251 | | * | 7/2008 |

OTHER PUBLICATIONS

Weizhuang et al, the article "Production of Pure Ammonium Tungstate by One-Step Removal of P, AS, MO through Ion-Exchange", 1995, Int. J. of Refractory Metals & Hard Materials 13, pp. 217-220.*
And Luo et al, the article "A novel process for recovery of tungsten and vanadium from leach solution of tungsten alloy scrap", 2003, Minerals Engineering 16, pp. 665-670.*
Muto et al, English Machine translation of JP 2008-150251, pp. 1-8.*
Liangcai et al, English Machine Translation of CN1865463, pp. 1-4.*
Notice of Grounds of Rejection in Japanese Patent Application No. 2009-058412, dated Feb. 12, 2013.
Notice of Grounds of Rejection in Japanese Patent Application No. 2009-058412, dated May 21, 2013.
"Metallurgy of Tungsten at Tokyo Tungsten Co., Ltd.," Journal of the Mining and Materials Processing Institute of Japan, vol. 109, No. 12, pp. 1175-1180 (1993).
Cholmogovor, A.G. et al., "Principles of sorption of tungsten from sulfuric solutions by anionites comprising methylacrylate copolymer," Izv Vyssh Uchebn Zaved Khim Khim Teknol, vol. 25, No. 2, pp. 187-192 (1982).
Extended European Search Report in European Patent Application No. 14155550.8, dated Apr. 9, 2014.
Ying-pin Wen et al., "Research and Progress of Tungsten and Molybdenum Separation," Hunan Metallurgy, 33 (6), Nov. 30, 2005, pp. 8-11.
Office Action in Chinese Patent Application No. 201080065208.1, dated Nov. 5, 2013.

* cited by examiner

*Primary Examiner* — Nam Nguyen
*Assistant Examiner* — Claire Norris
(74) *Attorney, Agent, or Firm* — Venable LLP; Michael A. Sartori; Annette K. Kwok

(57) ABSTRACT

A method for producing an ammonium tungstate aqueous solution includes the steps of: adding sulfuric acid to a solution containing tungstate ions; bringing the solution having the sulfuric acid added therein, into contact with an anion exchange resin; and bringing the anion exchange resin into contact with an aqueous solution containing ammonium ions.

14 Claims, 20 Drawing Sheets

METHOD FOR PRODUCING AMMONIUM TUNGSTATE AQUEOUS SOLUTION

TECHNICAL FIELD

The present invention relates to a method for producing an ammonium tungstate aqueous solution.

BACKGROUND ART

A cemented carbide containing tungsten carbide (WC) as a main component, containing cobalt (Co), nickel (Ni), or the like as a binder metal, and having a carbide of Ti or Ta added thereto for improvement of performance is excellent in hardness and wear resistance, and is therefore widely used in various fields as a cutting tool, a wear-resisting tool, a mining tool, or the like. At present, there are a large amount of scraps of such tools having been used in the various fields. Hence, recycling thereof has been drawing attention.

Among them, tungsten, which is a scarce resource, is contained in each of the above-described tools by approximately 80 mass %. Accordingly, various methods have been proposed to recover tungsten from such a tool scrap. For example, the scrap is smelted with sodium nitrate to obtain sodium tungstate ($Na_2WO_4$) as a water soluble salt, which is then converted into ammonium tungstate (($NH_4)_2WO_4$) to recover tungsten carbide in the end.

Ammonium tungstate can be highly purified as ammonium paratungstate (APT) by crystallizing an aqueous solution thereof. By calcinating, reducing, and carbonizing the crystal thus obtained, tungsten carbide can be readily obtained. Hence, ammonium tungstate is an important substance in the above-described recycling process.

An exemplary, proposed method for producing such ammonium tungstate is to produce an ammonium tungstate aqueous solution by bringing a sodium tungstate aqueous solution into contact with a Cl type strong base anion exchange resin, and thereafter eluting using ammonium chloride and an ammonia-containing aqueous solution (Japanese Patent Laying-Open No. 2008-150251 (Patent Literature 1)).

Alternatively, for example, Japanese National Patent Publication No. 2000-514030 (Patent Literature 2) disclose a method of obtaining a high-purity tungstate solution by treating, with an acid, an alkaline tungstate solution contaminated by vanadium, molybdenum, and the like, so as to adjust pH thereof to 7 to 10 to produce a precipitate containing vanadium; filtering it; separating therefrom impurities other than the molybdenum ions, by means of an ion exchanger with a weak or moderate basicity; filtering it; treating this filtrate using a sulfide to produce thiomolybdate; and separating this thiomolybdate using a sulfide type ion exchanger.

Furthermore, for example, Chinese Examined Patent Publication No. 1016158 (Patent Literature 3) discloses a method of obtaining a high-purity tungstate solution by sulfurating $MoO_4^{2-}$ ions in the tungstate solution to produce $MoS_4^{2-}$ ions; and separating the $MoS_4^{2-}$ ions therefrom by selectively adsorbing them to a strong base anion exchange resin.

CITATION LIST

Patent Literature

PTL 1: Japanese Patent Laying-Open No. 2008-150251
PTL 2: Japanese National Patent Publication No. 2000-514030
PTL 3: Chinese Examined Patent Publication No. 1016158

SUMMARY OF INVENTION

Technical Problem

In comparison to tungstate ions ($WO_4^{2-}$; hereinafter also referred to as "mono tungstate ions") and poly tungstate ions (which are regarded as a generic terms for $HW_6O_{21}^{5-}$ and the like in the present invention as described below and hereinafter also referred to as "poly tungstate ions") in respective aqueous solutions at the same concentration, a break through capacity of an anion exchange resin for the tungstate ions is lower than that for the poly tungstate ions when adsorbing them to the anion exchange resin. Hence, various conditions during the adsorption thereof have to be controlled strictly. In addition, exchange efficiency is low. Furthermore, the break through capacity for the tungstate ions is greatly dependent on the concentration thereof in the solution as compared with that for the poly tungstate ions. If the concentration thereof is high to exceed 100 g/L, an amount of adsorption until the break through point will be small. Hence, the adsorption of the tungstate ions needs to be done with the concentration thereof being relatively low such as approximately 30-50 g/L. Accordingly, when adsorbing the tungstate ions into the anion exchange resin and exposing it to an eluent containing ammonium ions so as to obtain ammonium tungstate, a massive amount of water is used, disadvantageously.

On the other hand, in addition to the above-described advantages over the tungstate ions, the poly tungstate ions allow the anion exchange resin to adsorb an amount of tungsten 2.4 times larger than an amount of adsorbed tungsten allowed by the tungstate ions, in terms of equivalent volume of ion exchange resin (number of moles of tungsten that can be adsorbed to a predetermined number of exchange groups). The amount of adsorbed tungsten 2.4 times larger is obtained when the poly tungstate ions are $HW_6O_{21}^{5-}$. When the poly tungstate ions are $H_2W_{12}O_{40}^{6-}$, the amount of adsorbed tungsten is 4 times larger. Thus, it can be expected to greatly improve exchange efficiency provided by the anion exchange resin.

However, when adsorbing the poly tungstate ions into the anion exchange resin and thereafter eluting using an eluent containing ammonium ions, a large amount of ammonium tungstate salt is generated, disadvantageously. When such salt (crystal) is generated in an anion exchange resin tower (resin packed tower) filled with an anion exchange resin, the anion exchange resin is damaged or the tower is blocked (clogged). Thus, although the poly tungstate ions are expected to provide the above-described advantages, it has been considered very difficult to industrially utilize the poly tungstate ions to obtain ammonium tungstate using an anion exchange resin.

Further, in the method of Patent Literature 2, the number of processes in obtaining the high-purity tungstate solution are large and the processes are complicated. Accordingly, there has been a demand for a method of more efficiently producing a tungstate solution.

Meanwhile, although the method of Patent Literature 3 advantageously eliminates need of the step of filtering out the precipitate, $MoS_4^{2-}$ is firmly adsorbed to the basic anion exchange resin to result in difficulty of elution. Hence, it needs to be oxidized into $MoO_4^{2-}$ using an oxidizing agent such as NaClO, then the $MoO_4^{2-}$ needs to be eluted, and then the anion exchange resin needs to be regenerated. Thus, the process becomes complicated. In addition, the application of such an oxidizing agent results in shortened life of the anion exchange resin, disadvantageously.

The present invention has been made in view of the above-described circumstances, and has its object to provide a method for producing an ammonium tungstate aqueous solution from a tungstic acid alkali metal salt aqueous solution using an anion exchange resin, whereby tungsten can be highly efficiently recovered while suppressing generation of salt (crystal) even though poly tungstate ions are produced.

The present invention has another object to provide a method for producing a high-purity ammonium tungstate aqueous solution.

Solution to Problem

According to a first aspect of the present invention, there can be provided a method for producing an ammonium tungstate aqueous solution, including the steps of: adding sulfuric acid to a solution containing tungstate ions; bringing the solution having the sulfuric acid added therein, into contact with an anion exchange resin; and bringing the anion exchange resin into contact with an aqueous solution containing ammonium ions.

Further, in the first aspect of the present invention, the aqueous solution containing the ammonium ions is preferably ammonia solution.

Here, the first aspect of the present invention preferably includes the steps of: recovering a discharged solution discharged from the anion exchange resin in the step of bringing into contact with the anion exchange resin; and using the discharged solution recovered in the step of recovering, as the solution containing the tungstate ions, or adding the discharged solution to the solution containing the tungstate ions.

According to a second aspect of the present invention, there can be provided a method for producing an ammonium tungstate aqueous solution, including the steps of: decreasing a pH of a solution containing tungstate ions and vanadate ions; bringing the solution having the pH decreased, into contact with an anion exchange resin; and eluting the vanadate ions from the anion exchange resin.

Here, in the second aspect of the present invention, the pH of the solution is preferably decreased to not less than 7 and not more than 9.

Further, in the second aspect of the present invention, the solution preferably has a tungsten oxide concentration of not less than 20 g/L and not more than 150 g/L, and preferably has a vanadium concentration of not less than 15 mg/L and not more than 1000 mg/L.

Further, in the second aspect of the present invention, in the step of bringing into contact with the anion exchange resin, the solution having the pH decreased is preferably supplied to the anion exchange resin or the anion exchange resin is preferably soaked in the solution having the pH decreased.

Further, in the second aspect of the present invention, a ratio of a content of vanadium to a content of tungsten is preferably $1 \times 10^{-4}$ or smaller in a discharged solution discharged from the anion exchange resin.

Further, in the second aspect of the present invention, the step of eluting the vanadate ions is preferably performed by bringing a basic solution into contact with the anion exchange resin.

Further, in the second aspect of the present invention, the basic solution is preferably a solution having a pH of 9 or higher and containing at least one selected from a group consisting of a sodium hydroxide aqueous solution, a potassium hydroxide aqueous solution, and ammonia solution.

Further, in the second aspect of the present invention, a solution containing at least one selected from a group consisting of chloride ions, sulfate ions, and nitrate ions is preferably brought into contact with the anion exchange resin after the contact with the basic solution.

According to a third aspect of the present invention, there can be provided a method for producing an ammonium tungstate aqueous solution, including the steps of: producing a polyacid solution containing poly tungstate ions and Mo-containing polyacid ions; adsorbing the poly tungstate ions to a first anion exchange resin of an anion exchange resin and adsorbing the Mo-containing polyacid ions to a second anion exchange resin of the anion exchange resin by supplying the polyacid solution to the anion exchange resin constituted of the first anion exchange resin and the second anion exchange resin connected to each other, such that the first anion exchange resin is first supplied with the polyacid solution; disconnecting the first anion exchange resin and the second anion exchange resin from each other; and bringing an aqueous solution containing ammonium ions, into contact with the first anion exchange resin after the step of disconnecting.

Here, in the third aspect of the present invention, in the step of bringing the aqueous solution containing the ammonium ions into contact, ammonia solution is preferably brought into contact therewith.

Further, in the third aspect of the present invention, the polyacid solution preferably has a pH of not less than 3.5 and not more than 8.

Further, the third aspect of the present invention preferably includes the step of bringing a solution containing at least one selected from a group consisting of chloride ions, nitrate ions, and sulfate ions, into contact with the first anion exchange resin after the step of bringing the ammonia solution into contact therewith.

Further, the third aspect of the present invention preferably includes the steps of: obtaining a reconnected anion exchange resin by connecting the first anion exchange resin and the second anion exchange resin to each other, the first anion exchange resin being after the step of bringing the solution into contact therewith, the second anion exchange resin being after the step of adsorbing the Mo-containing polyacid ions; adsorbing the poly tungstate ions to the second anion exchange resin and adsorbing the Mo-containing polyacid ions to the first anion exchange resin by supplying the polyacid solution to the reconnected anion exchange resin such that the second anion exchange resin is first supplied with the polyacid solution; and bringing ammonia solution into contact with the second anion exchange resin.

According to a fourth aspect of the present invention, there can be provided a method for producing an ammonium tungstate aqueous solution, including the steps of: producing a polyacid solution containing poly tungstate ions and Mo-containing polyacid ions; adsorbing the poly tungstate ions to a first anion exchange resin of an anion exchange resin without adsorbing the Mo-containing polyacid ions thereto, by supplying the polyacid solution to the anion exchange resin constituted of the first anion exchange resin, a second anion exchange resin, and a third anion exchange resin connected to one another in this order, such that the first anion exchange resin is first supplied with the polyacid solution; disconnecting the first anion exchange resin and the second anion exchange resin from each other; and bringing ammonia solution into contact with the first anion exchange resin after the step of disconnecting.

Here, the fourth aspect of the present invention preferably includes the step of bringing a solution containing at least one selected from a group consisting of chloride ions, nitrate ions, and sulfate ions, into contact with the first anion exchange resin after the step of bringing the ammonia solution into contact therewith.

Further, the fourth aspect of the present invention preferably includes the steps of: obtaining a reconnected anion exchange resin by connecting the second anion exchange resin, the third anion exchange resin, and the first anion exchange resin in this order, the second anion exchange resin being after the step of adsorbing the Mo-containing polyacid ions, the third anion exchange resin being after the step of adsorbing the Mo-containing polyacid ions, the first anion exchange resin being after the step of bringing the solution into contact therewith; adsorbing the poly tungstate ions to the second anion exchange resin without adsorbing the Mo-containing polyacid ions thereto, and adsorbing the Mo-containing polyacid ions to the first anion exchange resin, by supplying the polyacid solution to the reconnected anion exchange resin such that the second anion exchange resin is first supplied with the polyacid solution; and bringing ammonia solution into contact with the second anion exchange resin.

Here, the fourth aspect of the present invention preferably includes the step of bringing a solution containing at least one selected from a group consisting of chloride ions, sulfate ions, and nitrate ions, into contact with the second anion exchange resin after the step of bringing the ammonia solution into contact therewith.

According to a fifth aspect of the present invention, there can be provided a method for producing an ammonium tungstate aqueous solution, including the steps of: generating polyacid ions of tungsten, and polyacid ions of molybdenum or vanadium and/or polyacid cluster ions of tungsten and molybdenum or vanadium by adding sulfuric acid to a solution containing at least tungstate ions to adjust a pH thereof to not less than 3.5 and not more than 9; separating the polyacid ions from one another using affinity (selectivity) of ion exchange of the polyacid ions, by bringing the solution having the sulfuric acid added therein into contact with an anion exchange resin; and bringing ammonia solution into contact with the anion exchange resin.

Advantageous Effects of Invention

According to the present invention, there can be provided a method for producing an ammonium tungstate aqueous solution from a tungstic acid alkali metal salt aqueous solution using an anion exchange resin, whereby tungsten can be highly efficiently recovered while suppressing generation of salt (crystal) even though poly tungstate ions are produced.

Further, according to the present invention, there can be provided a method for producing a high-purity ammonium tungstate aqueous solution.

Each of FIG. 5(a) to FIG. 5(e) is a schematic view illustrating a method for producing an ammonium tungstate aqueous solution in a third embodiment.

Each of FIG. 6(a) to FIG. 6(e) is a schematic view illustrating a method for producing an ammonium tungstate aqueous solution in a fourth embodiment.

Figure 7:
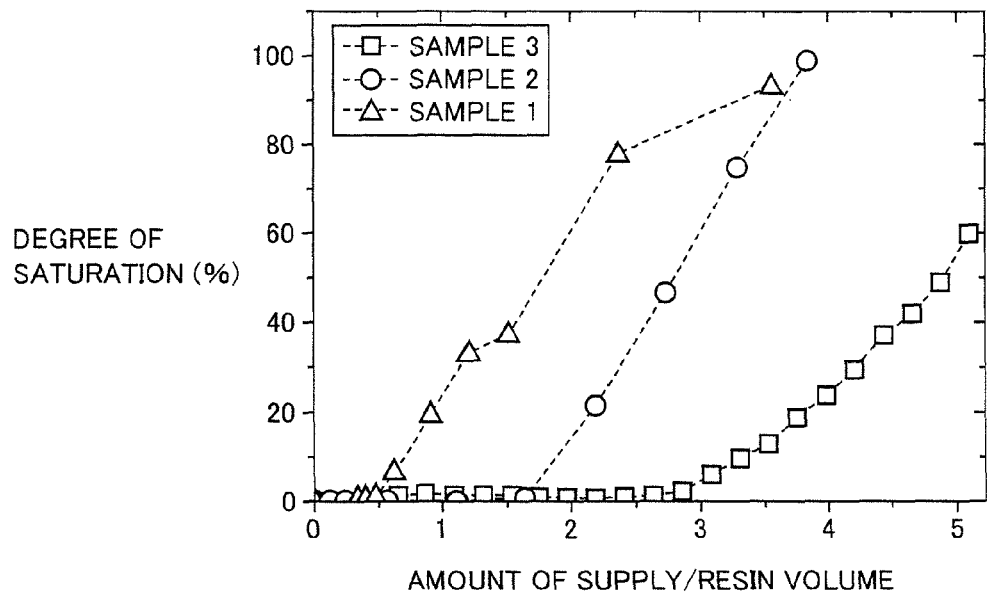

FIG. 7 shows a relation between a ratio of an amount of supply of each of samples 1-3 in an example 1 relative to a resin volume of each of anion exchange resins and a degree (%) of saturation of a solution discharged from each of the anion exchange resins.

Figure 8:
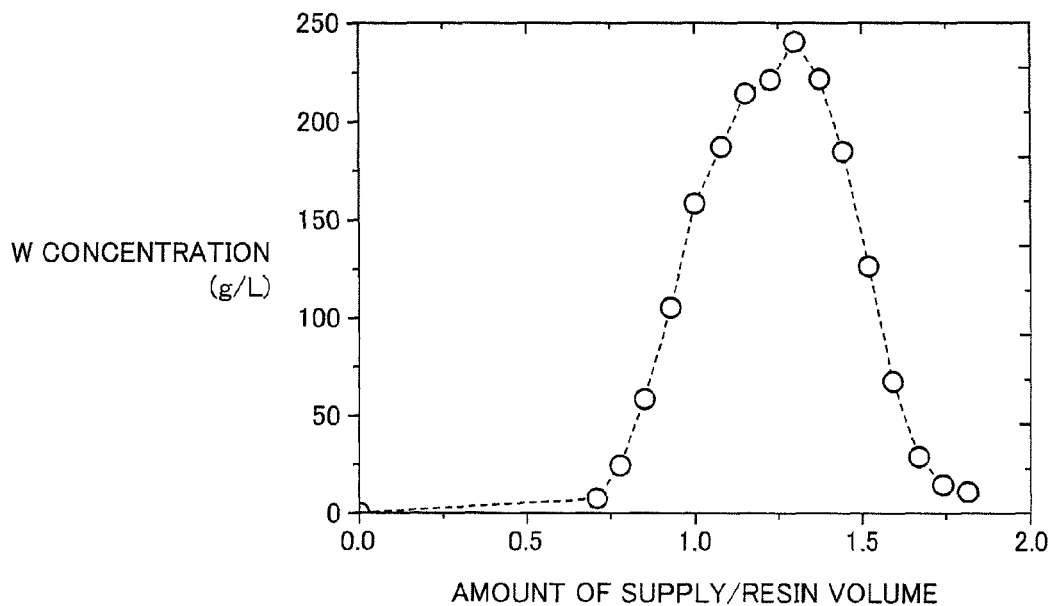

FIG. 8 shows a relation between the ratio of the amount of supply of sample 3 in example 1 relative to the resin volume of the anion exchange resin and the W concentration (g/L) in the discharged solution.

Figure 9:
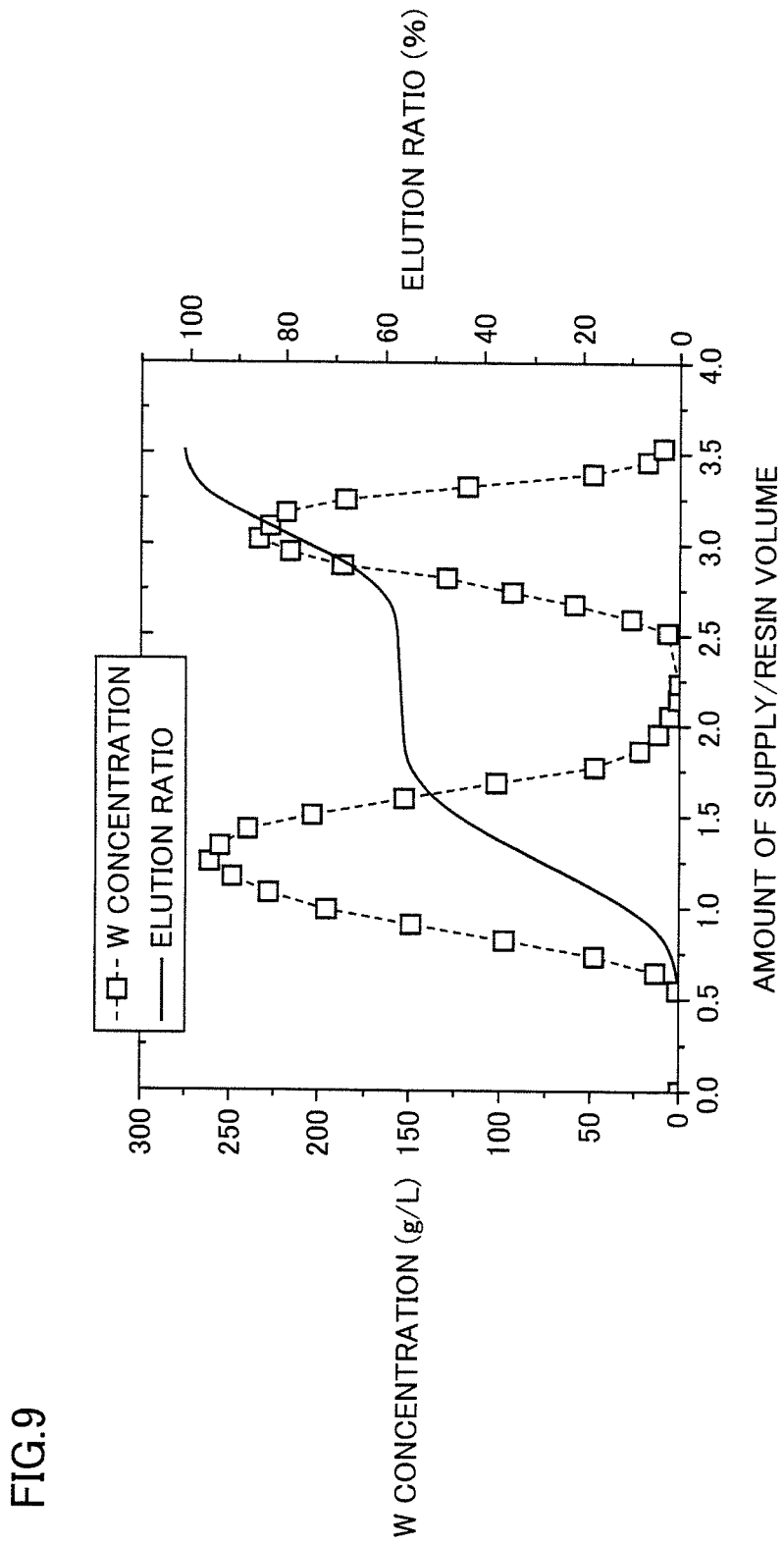

FIG. 9 shows a relation between a ratio of an amount of supply of a solution in two-stage elution of example 1 relative to the resin volume of the anion exchange resin and each of the W concentration (g/L) in the discharged solution and an elution ratio (%).

Figure 10:
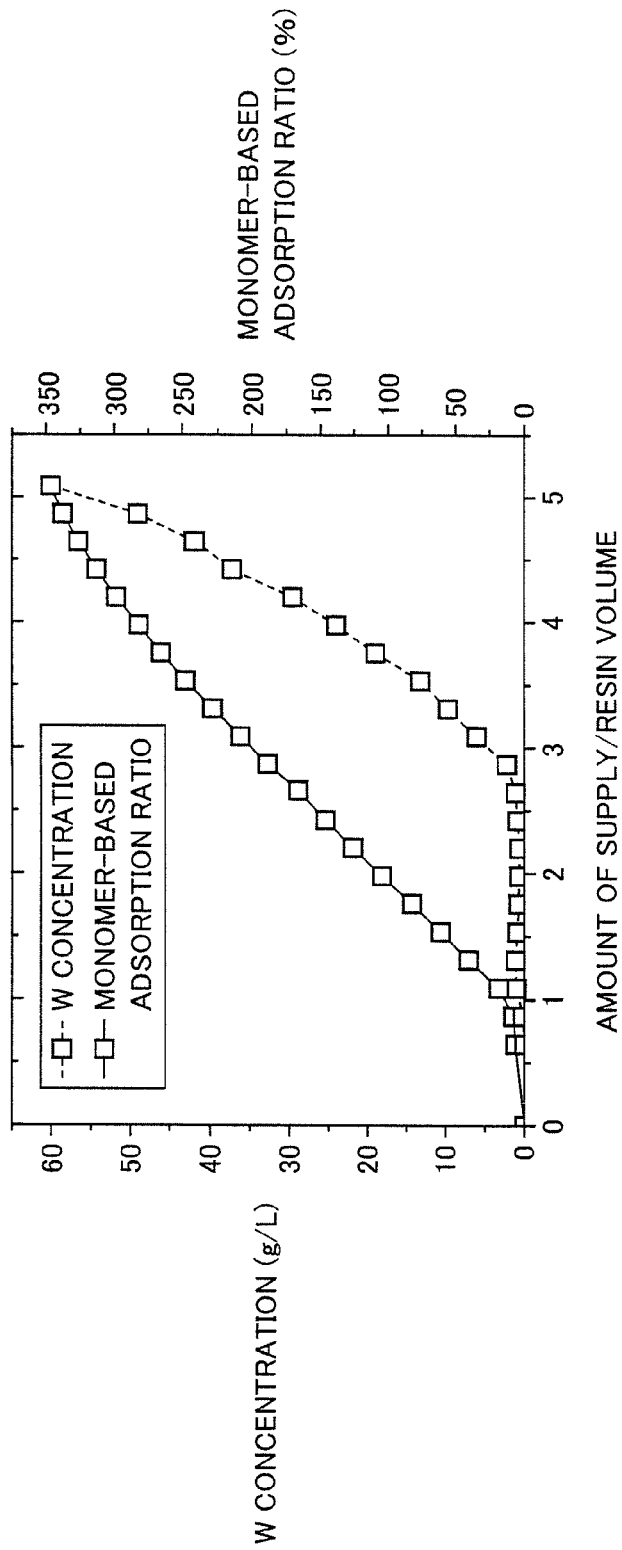

FIG. 10 shows a relation between a ratio of an amount of supply of an aqueous solution having a pH adjusted to 6.5 using sulfuric acid relative to the resin volume of the anion exchange resin and each of concentration (g/L) and monomer-based adsorption ratio (%) of W actually adsorbed in the anion exchange resin in example 1.

Figure 11:
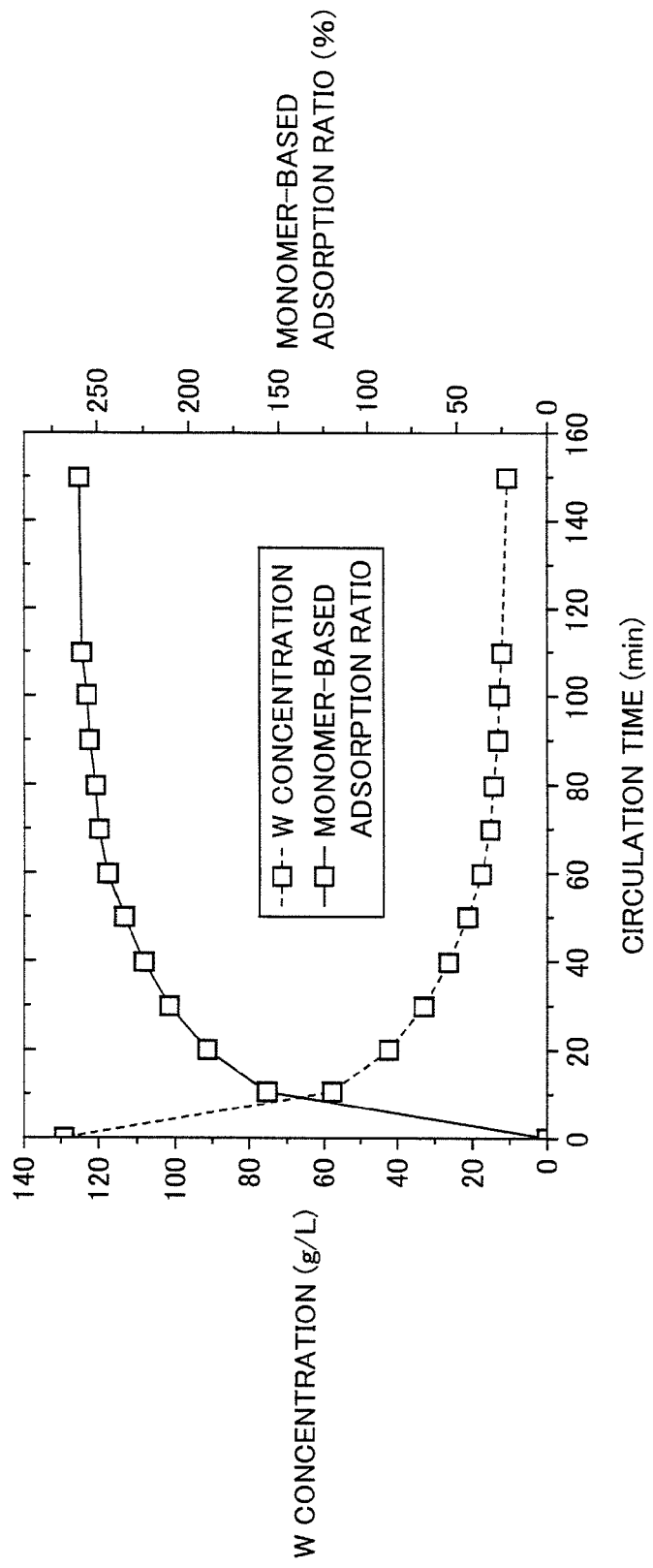

FIG. 11 shows a relation between a circulation time (min) and each of concentration (g/L) and monomer-based adsorption ratio (%) of W actually adsorbed in the anion exchange resin in example 1, when performing circulated adsorption with an aqueous solution prepared by adjusting a sodium tungstate aqueous solution, which has a W concentration of 130 g/L, to have a pH of 6.5 using sulfuric acid.

Figure 12:
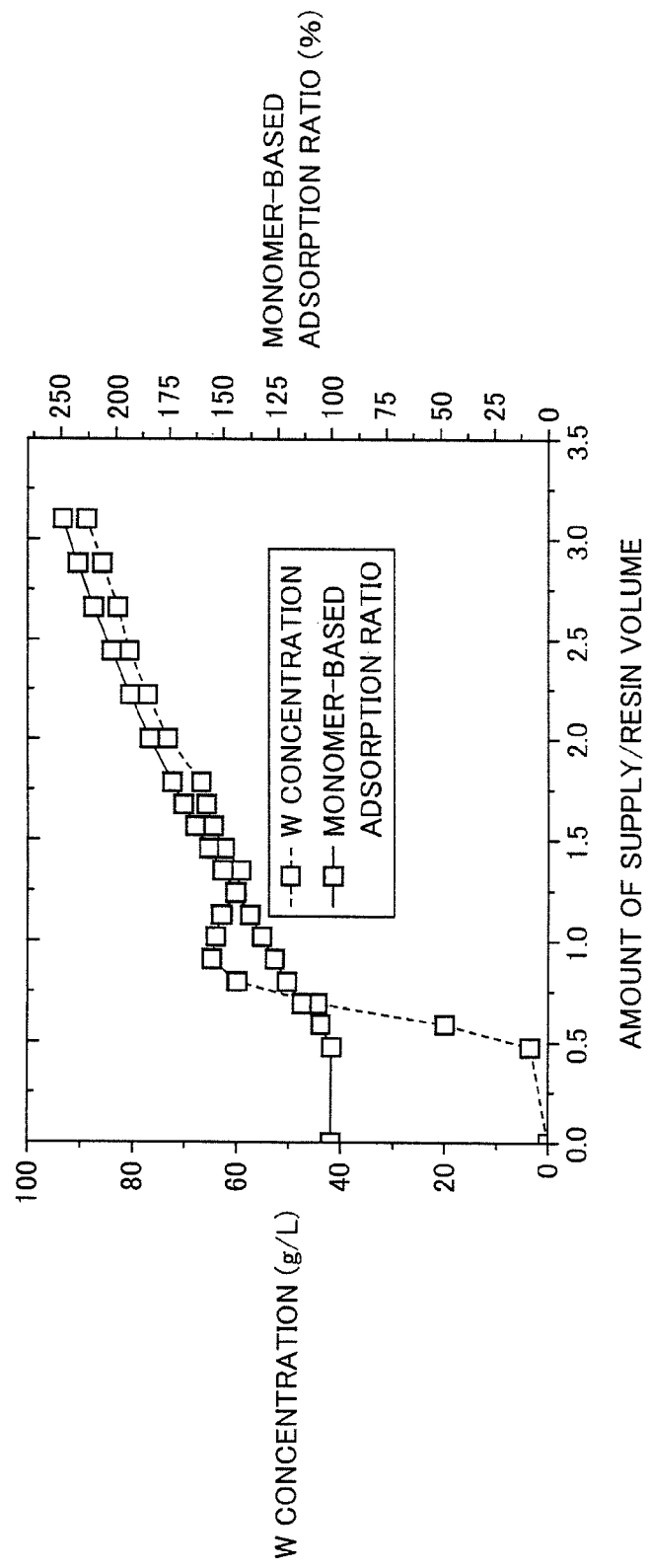

FIG. 12 shows a relation between a ratio of an amount of supply of an aqueous solution relative to a resin volume of a $WO_4$ type anion exchange resin and each of concentration (g/L) and monomer-based adsorption ratio (%) of W actually adsorbed in the anion exchange resin in example 1 when supplying the aqueous solution to the anion exchange resin, wherein the aqueous solution is prepared by adjusting a sodium tungstate aqueous solution, which has a W concentration of 120 g/L, to have a pH of 6.5 using sulfuric acid.

Figure 13:
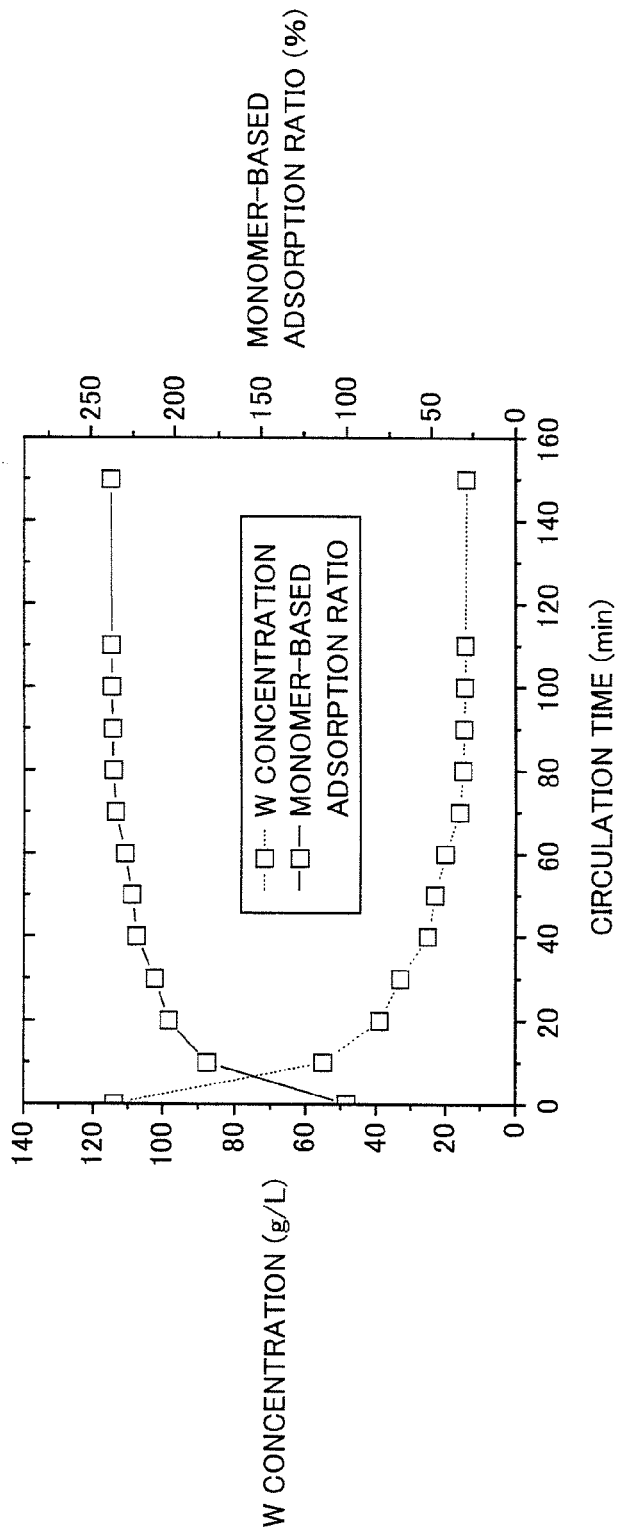

FIG. 13 shows a relation between a circulation time (min) and each of concentration (g/L) and monomer-based adsorption ratio (%) of W actually adsorbed in an $WO_4$ type anion exchange resin in example 1, when performing circulated adsorption with an aqueous solution prepared by adjusting a sodium tungstate aqueous solution, which has a W concentration of 120 g/L, to have a pH of 6.5 using sulfuric acid.

Figure 14:
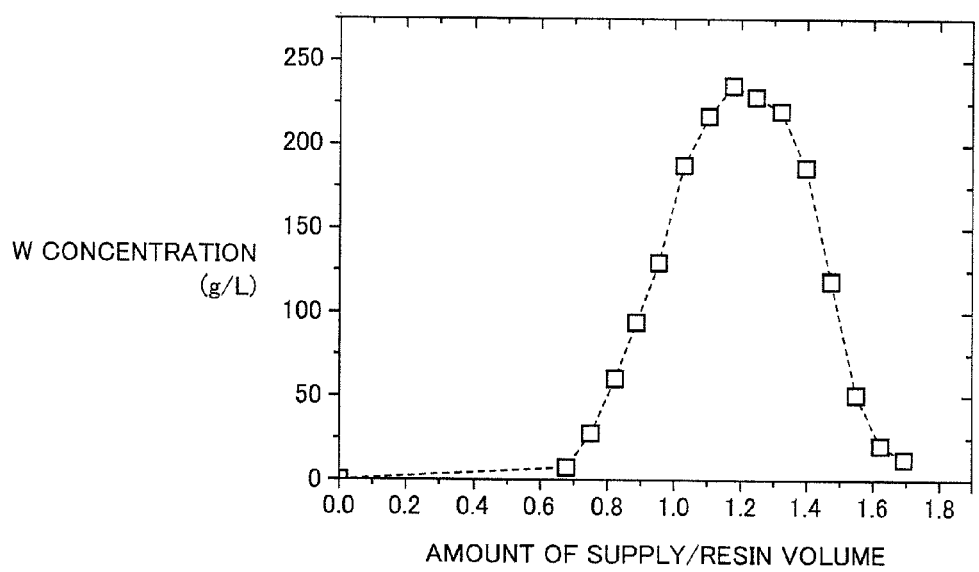

FIG. 14 shows a relation between a ratio of an amount of supply of ammonia solution relative to a resin volume of an anion exchange resin and W concentration (g/L) in a discharged solution in example 1, wherein the ammonia solution is supplied to a resin packed tower filled with the anion exchange resin, the anion exchange resin has poly tungatate ions adsorbed therein, and the discharged solution is discharged from the resin packed tower.

Figure 15:
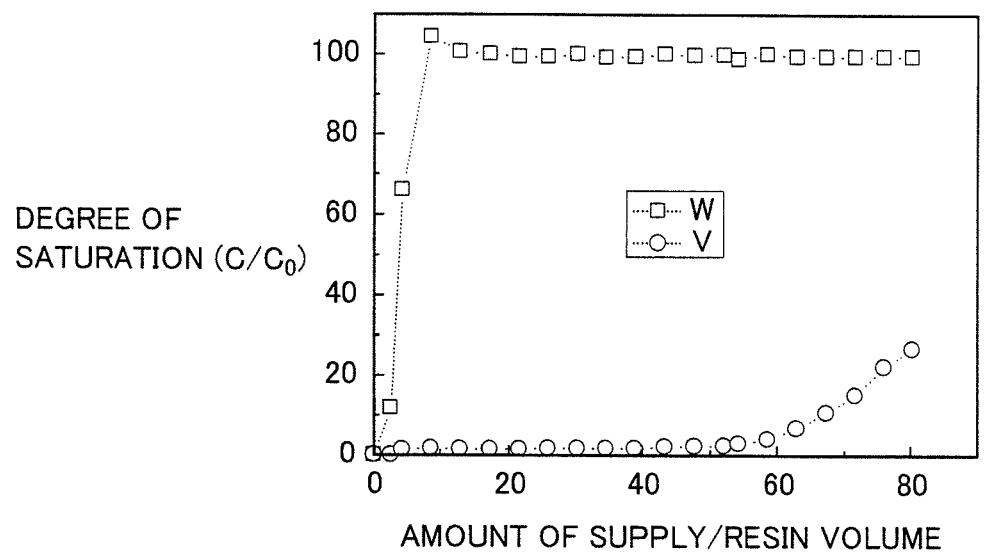

FIG. 15 shows a relation between each of a degree of W saturation and a degree of V saturation in a discharged solution from an anion exchange resin, to which an aqueous solution adjusted to have a pH of 8 has been supplied, and a ratio of an amount of supply of the aqueous solution relative to a resin volume of the anion exchange resin in example 2.

Figure 16:
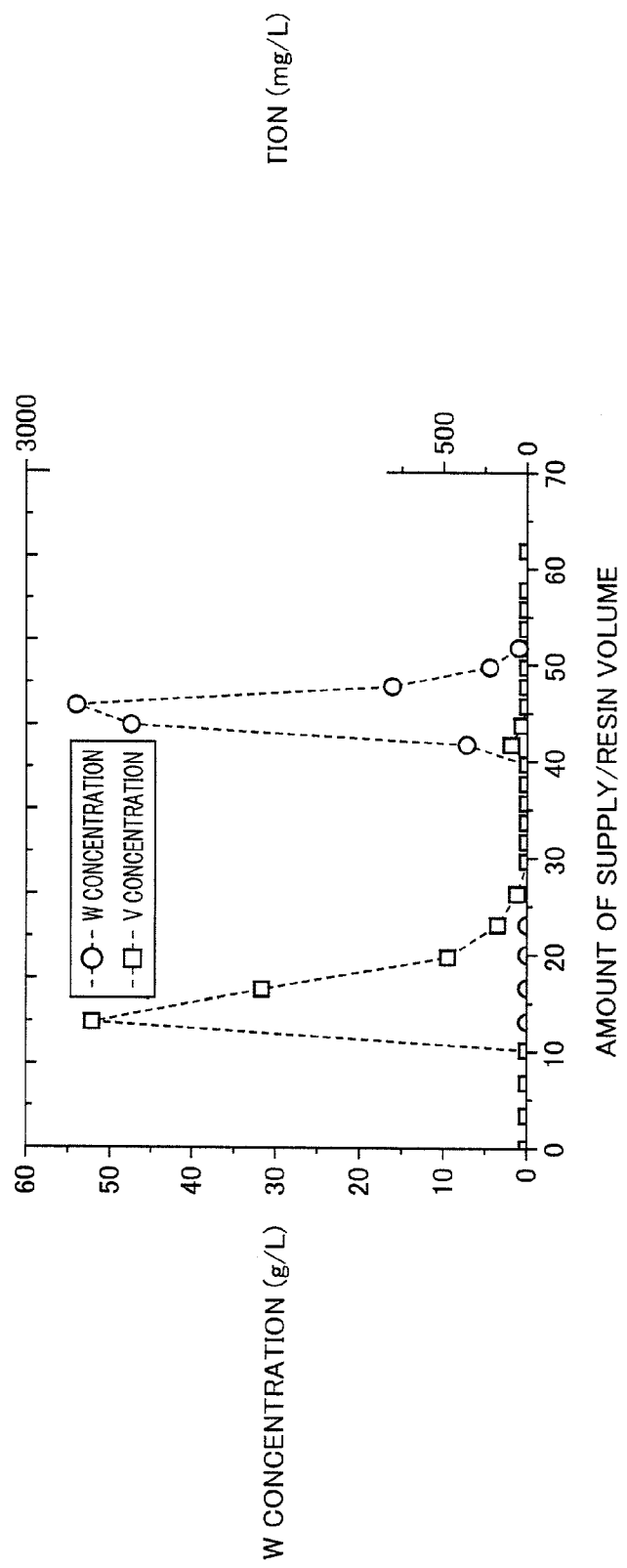

FIG. 16 shows a change of each of W concentration (g/L) and V concentration (mg/L) in a discharged solution discharged from an anion exchange resin, which has W-V polyacid cluster ions adsorbed therein, in example 2 when supplying a NaOH aqueous solution to the anion exchange resin and thereafter supplying a NaCl aqueous solution thereto.

Figure 17:
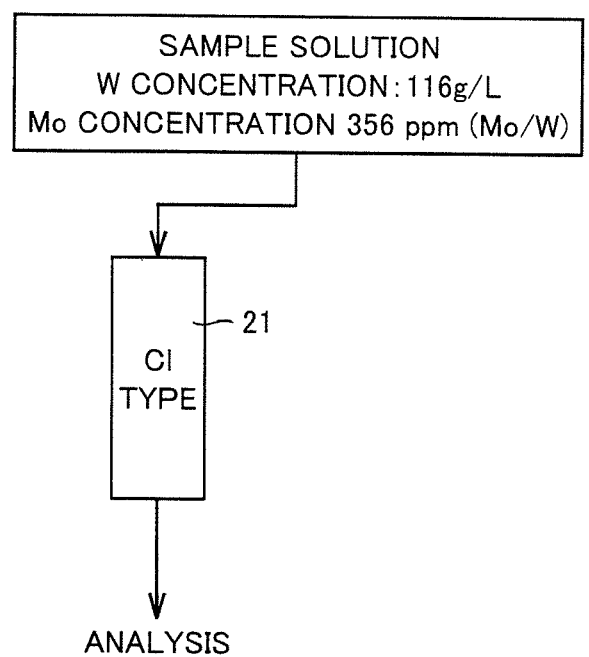

FIG. 17 is a schematic view of an experimental device in an example 4.

Figure 18:
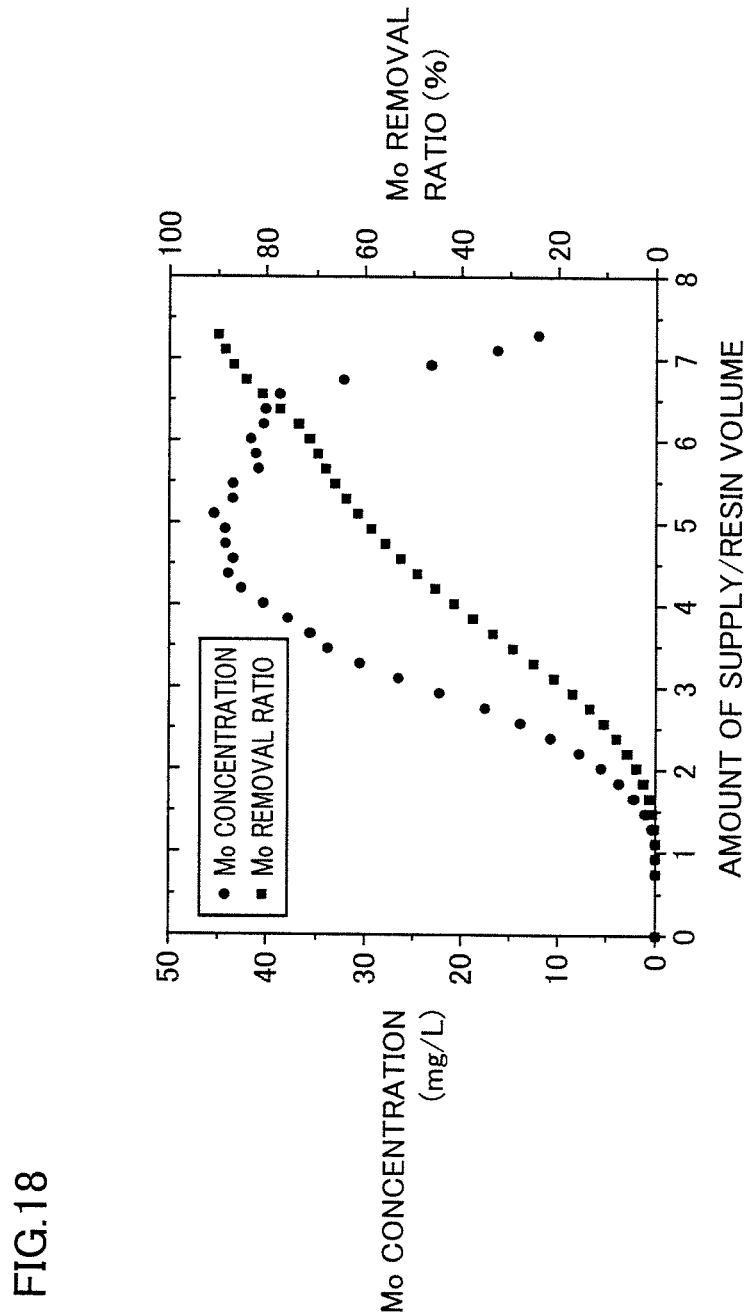

FIG. 18 shows a relation between each of Mo concentration (mg/L) and Mo removal ratio (%) in a discharged solution in example 4 and a ratio of an amount of supply of a solution relative to a resin volume thereof.

Figure 19:
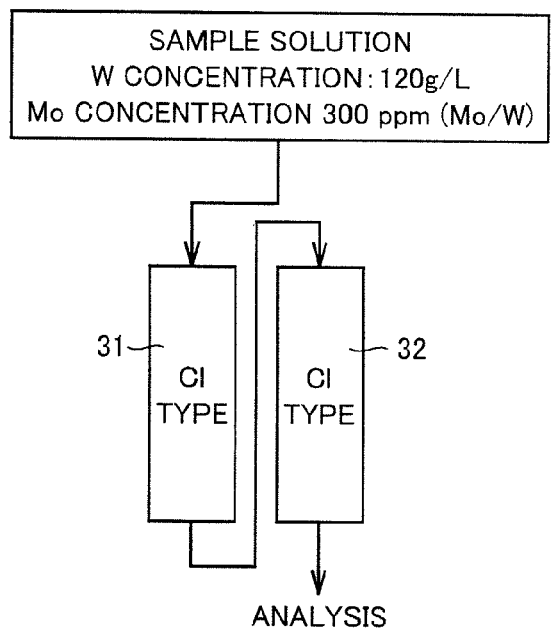

FIG. 19 is a schematic view of an experimental device in an example 5.

Figure 20:
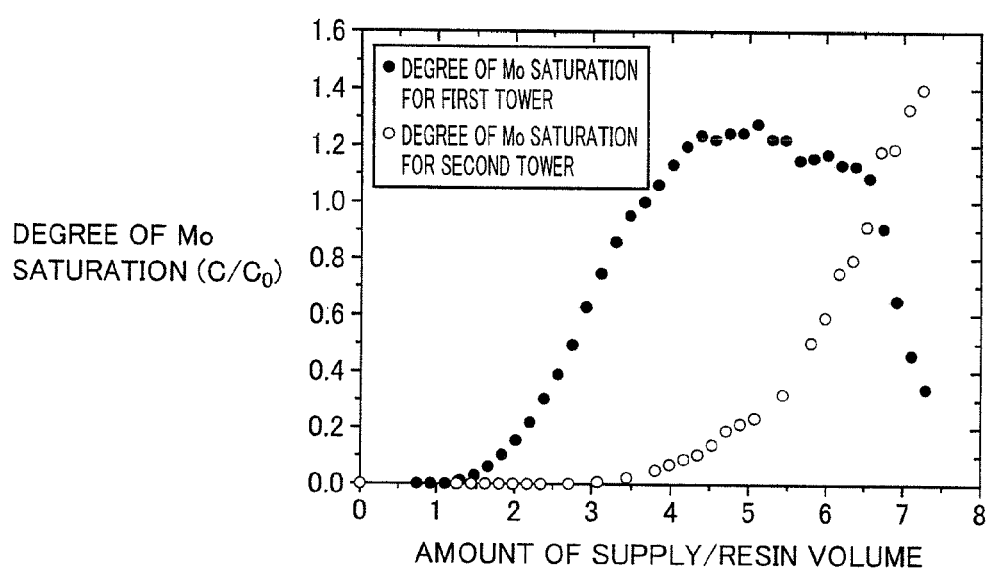

FIG. 20 shows a relation between each of degrees of Mo saturation ($C/C_0$) of a first ion exchange resin tower and a second ion exchange resin tower in example 5 and a ratio of an amount of supply of a solution relative to a resin volume thereof.

Figure 21:
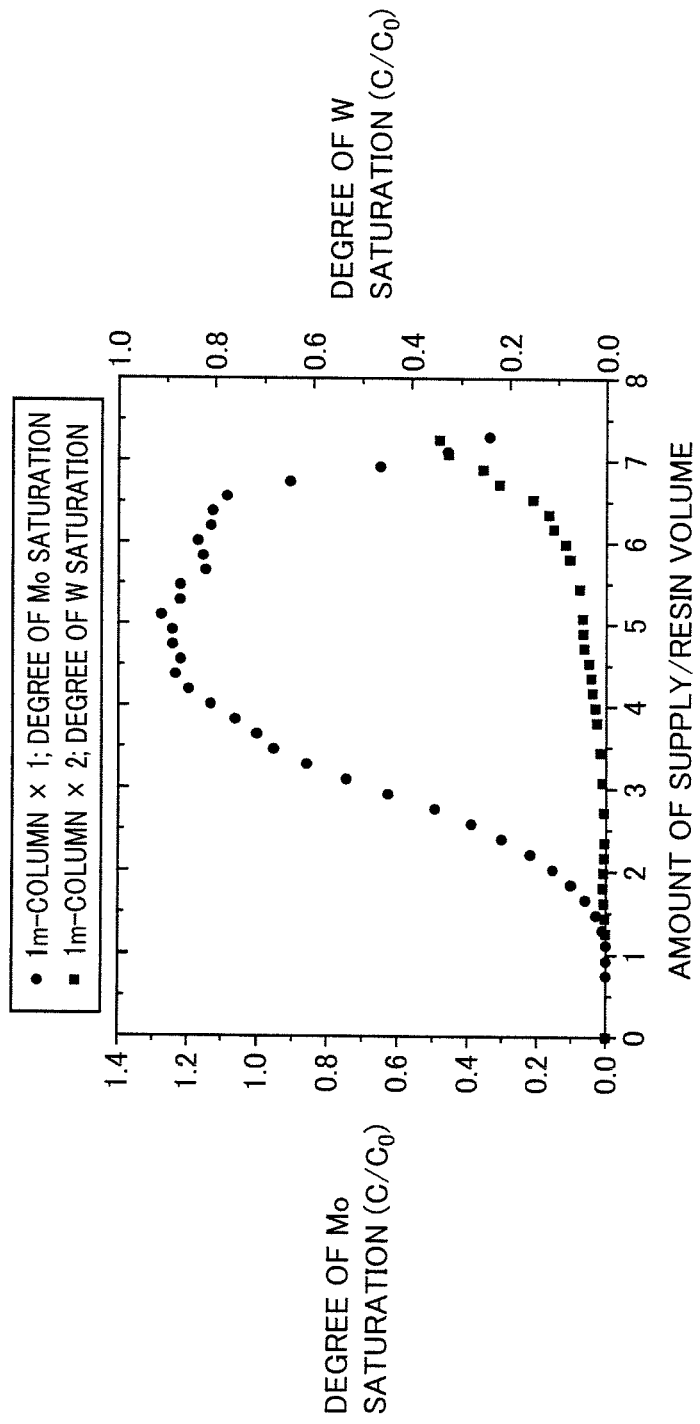

FIG. 21 shows a relation between each of a degree of Mo saturation ($C/C_0$) in the first ion exchange resin tower and a degree of W saturation ($C/C_0$) in total of the first and second ion exchange resin towers and a ratio of an amount of supply of a solution relative to a resin volume thereof in example 5.

Figure 22:
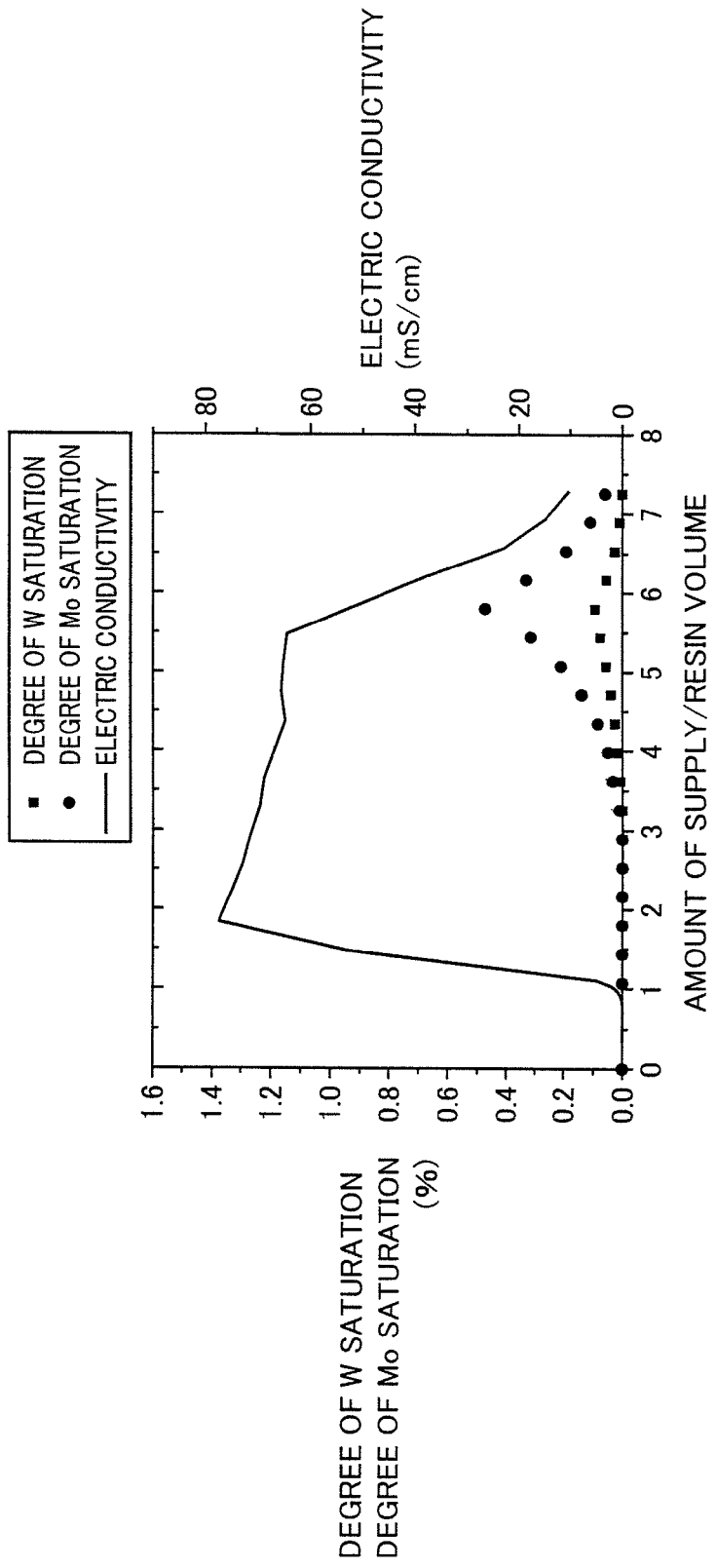
Figure 16:
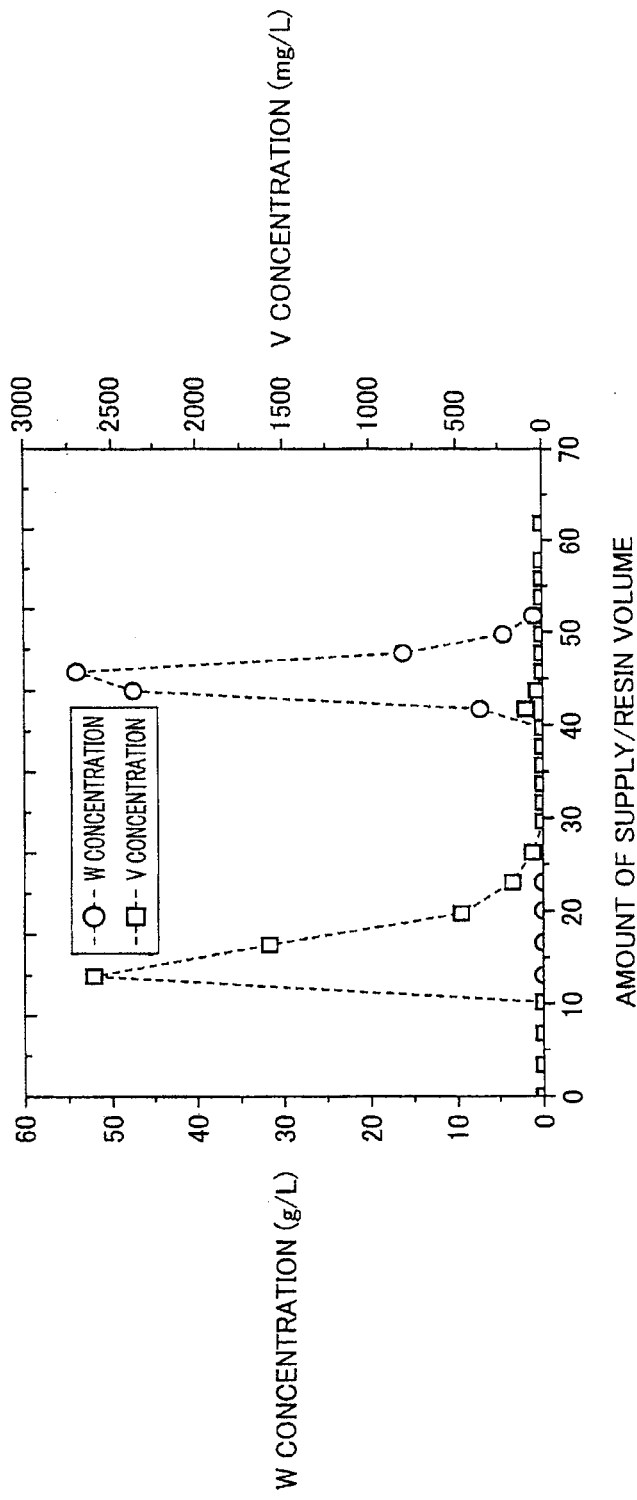

FIG. 22 shows a relation between each of a degree of Mo saturation ($C/C_0$) and a degree of W saturation ($C/C_0$) and a ratio of an amount of supply of a solution relative to a resin volume thereof in an example 6.

DESCRIPTION OF EMBODIMENTS

The following describes embodiments of the present invention. It should be noted that in the figures of the present invention, the same reference characters are to indicate the same or corresponding portions.

<First Embodiment>

Figure 1:
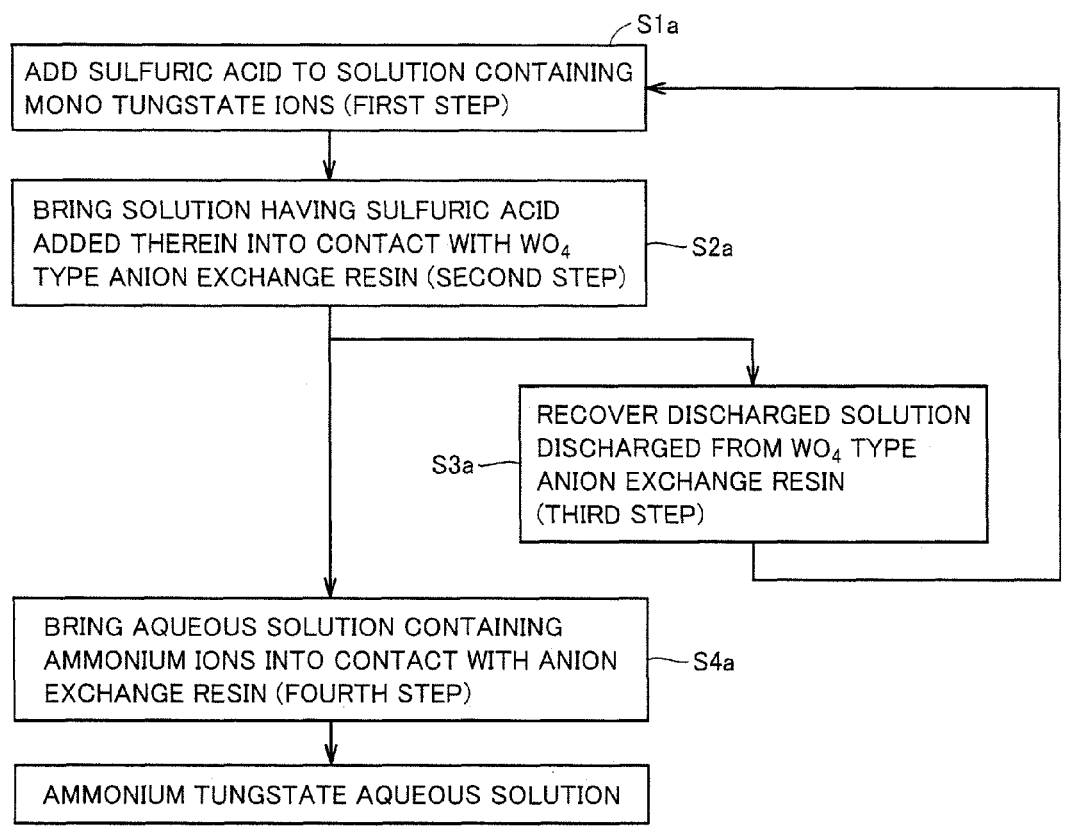
FIG. 1 is a flowchart for a method for producing an ammonium tungstate aqueous solution in a first embodiment.

FIG. 1 shows a flowchart of a method for producing an ammonium tungstate aqueous solution in a first embodiment. The method for producing the ammonium tungstate aqueous solution in the first embodiment is characterized by including: a first step of adding sulfuric acid to a solution containing mono tungstate ions; a second step of bringing the solution having the sulfuric acid added therein, into contact with a $WO_4$ type anion exchange resin; a third step of recovering a discharged solution discharged from the $WO_4$ type anion exchange resin; and a fourth step of bringing an aqueous solution containing ammonium ions, into contact with the anion exchange resin. The production method in the first embodiment can include any other steps as long as the production method includes at least the first step to the fourth step.

In the method for producing the ammonium tungstate aqueous solution in the first embodiment, the first step is performed as illustrated in a step S1a to add sulfuric acid to a solution containing mono tungstate ions. In the first step, the addition of sulfuric acid to the solution containing mono tungstate ions allows the pH thereof to be decreased to generate poly tungstate ions (hereinafter, also referred to as "poly tungstate ions ($H_2SO_4$)") therein, thereby producing a solution containing poly tungstate ions.

The solution containing mono tungstate ions, such as a tungstic acid alkali metal salt aqueous solution, has a pH of, for example, not less than 8.5 and not more than 13. When such a solution is provided with sulfuric acid to decrease the pH thereof to fall within a range of not less than 3.5 and not more than 8, in particular, not more than 7, poly tungstate ions stably exist instead of the mono tungstate ions. Thus, in the first step, it is preferable to decrease the pH of the solution to not less than 3.5 and not more than 8, more preferably not more than 7, by adding sulfuric acid to the solution containing mono tungstate ions. In this way, the mono tungstate ions in the solution can be changed into the poly tungstate ions.

Here, the term "tungstic acid alkali metal salt aqueous solution" is intended to indicate an aqueous solution with alkali metal salt of tungstic acid. The tungstic acid alkali metal salt aqueous solution may contain any other ions or compounds as long as the tungstic acid alkali metal salt aqueous solution contains at least alkali metal ions and tungstate ions ($WO_4^{2-}$) as its main component. Examples of the alkali metal salt of tungstic acid can include sodium tungstate, potassium tungstate, and the like. Thus, examples of the alkali metal ions constituting the tungstic acid alkali metal salt aqueous solution can include sodium ions ($Na^+$), potassium ions ($K^+$), and the like. It should be noted that the type of metal is not limited to only sodium and potassium.

The term "poly tungstate ion" is intended to indicate an ion including a plurality of tungsten (W) atoms. Examples thereof can include $HW_6O_{21}^{5-}$, $H_2W_{12}O_{40}^{6-}$, $W_{12}O_{41}^{10-}$, and the like. Of such poly tungstate ions, a poly tungstate ion generated by decreasing the pH of the solution by adding sulfuric acid thereto is referred to as "poly tungstate ion ($H_2SO_4$)" in this specification.

Next, as shown in a step S2a, the second step is performed to bring the solution having sulfuric acid added therein into contact with a $Wa_4$ type anion exchange resin. In the second step, the solution containing poly tungstate ions ($H_2SO_4$) can be brought into contact with the $WO_4$ type anion exchange resin, thereby adsorbing the poly tungstate ions ($H_2SO_4$) in the $WO_4$ type anion exchange resin.

Specifically, with this second step, in the anion exchange resin, ion exchange takes place between the mono tungstate ions and the poly tungstate ions ($H_2SO_4$), whereby the poly tungstate ions ($H_2SO_4$) are adsorbed to the anion exchange resin. Accordingly, the mono tungstate ions are discharged from the anion exchange resin.

It should be noted that the $WO_4$ type anion exchange resin is intended to indicate an anion exchange resin having mono tungstate ions ($WO_4^{2-}$) adsorbed therein.

Next, as shown in a step S3a, the third step is performed to recover the discharged solution thus discharged from the $WO_4$ type anion exchange resin. In the third step, the discharged solution including the mono tungstate ions and discharged from the $WO_4$ type anion exchange resin in the second step can be recovered. It is preferable to perform a step of using the discharged solution containing the mono tungstate ions and recovered in the third step, as the solution containing mono tungstate ions in the first step, or to perform a step of adding the discharged solution to the solution containing mono tungstate ions in the first step. In this case, tungsten can be likely to be recovered highly efficiently. The number of looping from the third step to the first step may be 0 or not less than 1.

Next, as shown in a step S4a, the fourth step is performed to bring an aqueous solution containing ammonium ions, into contact with the anion exchange resin. In the fourth step, an aqueous solution containing ammonium ions is brought into contact with the anion exchange resin having the poly tungstate ions ($H_2SO_4$) adsorbed therein, thereby decomposing the poly tungstate ions ($H_2SO_4$) to elute mono tungstate ions from the anion exchange resin.

In the above-described fourth step, the mono tungstate ions thus eluted react with the aqueous solution containing ammonium ions, thereby obtaining an ammonium tungstate aqueous solution. It should be noted that ammonia solution ($NH_4OH$) can be suitably used as the aqueous solution containing ammonium ions, for example.

Figure 2:
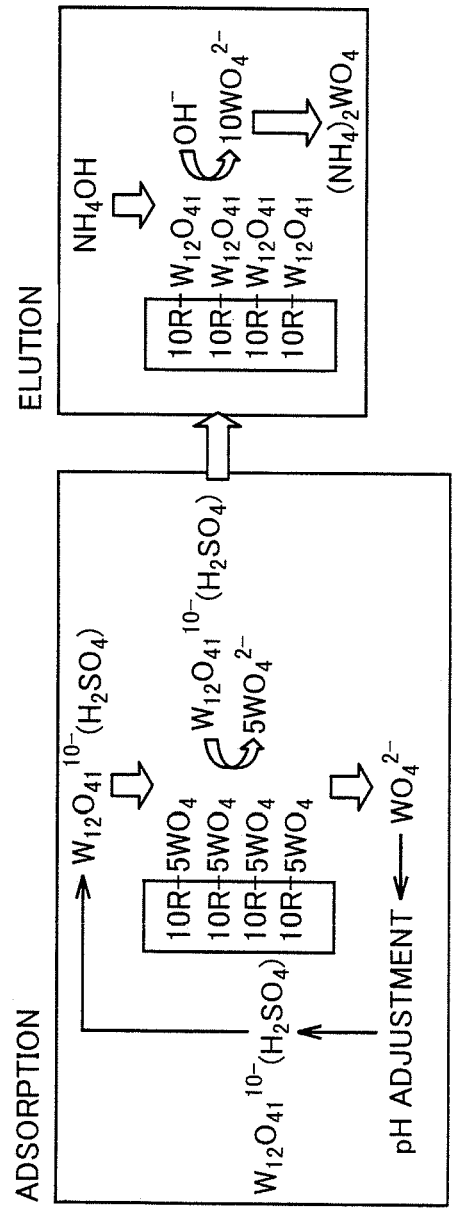
FIG. 2 is a conceptual view for the method for producing the ammonium tungstate aqueous solution in the first embodiment.

FIG. 2 shows a conceptual view of the method for producing the ammonium tungstate aqueous solution in the first embodiment. First, in the step of adsorption, sulfuric acid is added to the solution containing mono tungstate ions ($WO_4^{2-}$) to decrease the pH thereof to generate poly tungstate ions ($H_2SO_4$) (illustrated as "$W_{12}O_{41}^{10-}$ ($H_2SO_4$)" in FIG. 2). Then, the solution containing poly tungstate ions ($H_2SO_4$) is brought into contact with the $WO_4$ type anion exchange resin, whereby the ions adsorbed in the anion exchange resin are exchanged from $WO_4^{2-}$ to $W_{12}O_{41}^{10-}$ ($H_2SO_4$). It should be noted that a designation "10R" in FIG. 2 represents a resin constituting an adsorption site of the anion exchange resin.

Next, in the step of elution, the aqueous solution containing ammonium ions (represented as "NH$_4$OH" in FIG. 2) is brought into contact with the anion exchange resin having the poly tungstate ions ($H_2SO_4$) adsorbed therein, thereby decomposing the poly tungstate ions ($H_2SO_4$) to elute $WO_4^{2-}$. In this way, an ammonium tungstate (($NH_4$)$_2WO_4$) aqueous solution is obtained.

If, for example, hydrochloric acid is used to decrease the pH in the first embodiment instead of sulfuric acid, it is necessary to use ammonia solution having a very high concentration (for example, ammonia solution containing ammonia at a concentration of 8 mol/L or greater). This is because poly tungstate ions are eluted from the anion exchange resin and react with ammonium ions ($NH_4^+$) to generate crystal of $(NH_4)_{10}W_{12}O_{41}$. In order to suppress the generation of crystal, the pH of the ammonia solution needs to be maintained very high, with the result that the ammonia solution having a high concentration is required.

In analyzing whether or not the generation of such a precipitate can be suppressed using ammonia solution having a low concentration, it was perceived to change a form of the poly tungstate ions adsorbed in the anion exchange resin. As a result, it has been found that when adding sulfuric acid instead of hydrochloric acid to decrease the pH of the solution containing mono tungstate ions ($WO_4^{2-}$) and eluting them using ammonia solution having a concentration much lower than that of the ammonia solution having hydrochloric acid added therein, the generation of crystal of $(NH_4)_{10}W_{12}O_{41}$ does not take place during production of an ammonium tungstate aqueous solution. This is presumably because the ionic species existing in the aqueous solution after the elution is more stable in the aqueous solution as compared with the case of using hydrochloric acid.

According to such a method in the first embodiment, the precipitate of $(NH_4)_{10}W_{12}O_{41}$ can be suppressed using ammonia solution having a lower concentration, thereby producing an ammonium tungstate aqueous solution while recovering tungsten at a high recovery ratio.

<Second Embodiment>

Figure 3:
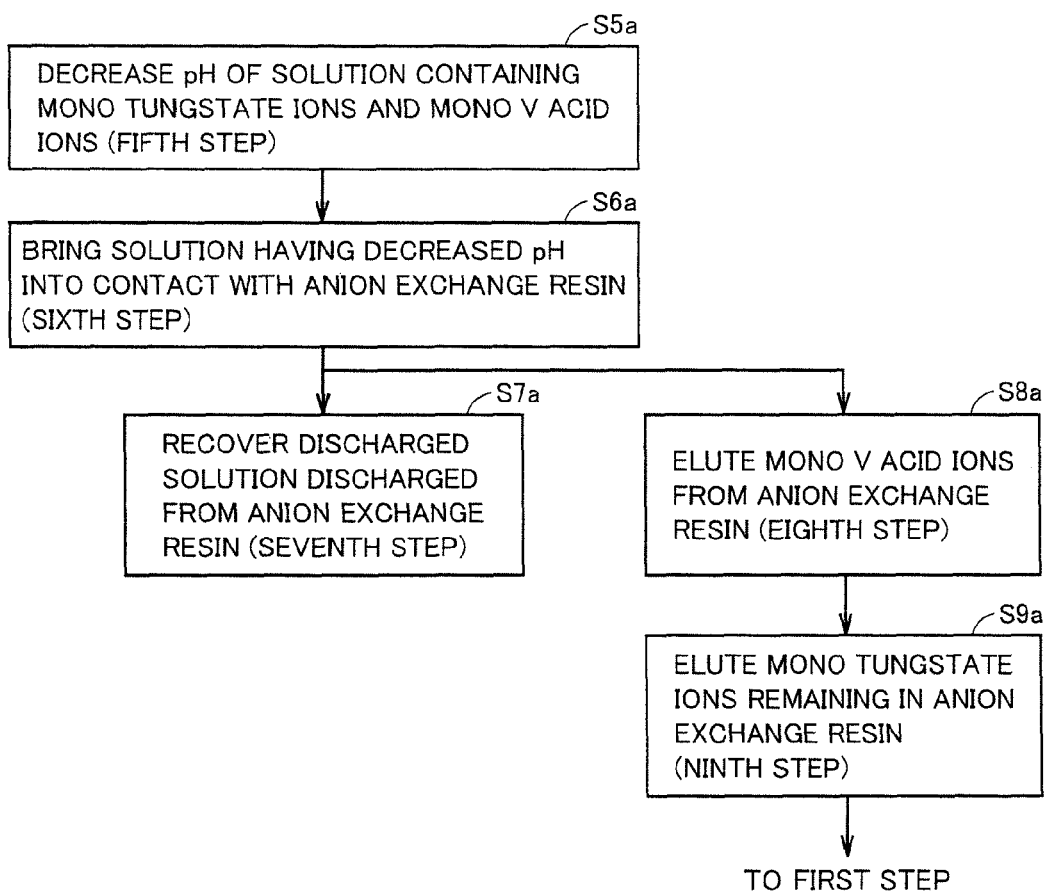
FIG. 3 is a flowchart for a method for producing an ammonium tungstate aqueous solution in a second embodiment.

FIG. 3 shows a flowchart of a method for producing an ammonium tungstate aqueous solution in a second embodiment. The method for producing the ammonium tungstate aqueous solution in the second embodiment is characterized by including: a fifth step of decreasing the pH of a solution containing mono tungstate ions and vanadate ions ($VO_3^-$; hereinafter also referred to as "mono V acid ions"); a sixth step of bringing the solution thus having decreased pH into contact with an anion exchange resin; a seventh step of recovering a discharged solution discharged from the anion exchange resin; an eighth step of eluting mono V acid ions from the anion exchange resin; and a ninth step of eluting mono tungstate ions remaining in the anion exchange resin. The production method in the second embodiment can include any other steps as long as the production method includes at least the fifth step to the ninth step.

In the method for producing the ammonium tungstate aqueous solution in the second embodiment, the fifth step is first performed to decrease the pH of the solution containing mono tungstate ions and mono V acid ions as shown in a step S5$a$. In the fifth step, by decreasing the pH of the solution containing mono tungstate ions and mono V acid ions, polyacid cluster ions of tungsten and vanadium (for example ions containing W, V, and O such as $W_3V_3O_{19}^{5-}$; hereinafter, also referred to as "W-V polyacid cluster ions") can be generated.

Here, it is preferable to decrease the pH of the solution containing mono tungstate ions and mono V acid ions to 9 or smaller. In the case where the pH of the solution containing mono tungstate ions and mono V acid ions is decreased to 9 or smaller, W-V polyacid cluster ions can be generated and stably exist in the solution. Examples of such a W-V polyacid cluster ion include $W_3V_3O_{19}^{5-}$, $W_5VO_{19}^{4-}$, $W_{12}VO_4^{3-}$, $W_{11}V_2O_4^{3}$, and the like. However, there are various types of W-V polyacid cluster ions and the W-V polyacid cluster ion is therefore not limited to these. In order to efficiently separate vanadium therefrom, it is more preferable to adjust the pH of the solution to around 8 (not less than 7 and not more than 9).

Some cemented carbides each containing tungsten carbide (WC) or the like as its main component generally contain vanadium carbide (VC) by not less than 0.1 mass % and not more than 0.5%. Such a cemented carbide is smelted with a molten salt such as sodium nitrate, which is then dissolved with water, thereby obtaining a sodium tungstate aqueous solution. This sodium tungstate aqueous solution can be used as an exemplary solution (solution containing mono tungstate ions and mono V acid ions) in the fifth step. For efficient removal of vanadium, tungsten oxide concentration ($WO_3$ concentration) in the solution containing mono tungstate ions and mono V acid ions is preferably not less than 20 g/L and not more than 150 g/L and vanadium concentration (V concentration) therein is preferably not less than 15 mg/L and not more than 1000 mg/L.

As a pH adjuster for decreasing the pH of the solution containing mono tungstate ions and mono V acid ions, it is preferable to use sulfuric acid ($H_2SO_4$) in consideration of affinity of ion exchange for the anion exchange resin. Apart from sulfuric acid, hydrochloric acid (HCl), nitric acid ($HNO_3$), or the like can be used, for example.

Next, as shown in a step S6$a$, the sixth step is performed to bring the solution thus having decreased pH into contact with the anion exchange resin. In the sixth step, the W-V polyacid cluster ions, generated in the solution as a result of the decrease of pH, can be adsorbed into the anion exchange resin. Specifically, here, the sixth step can be performed by, for example, supplying the solution containing W-V polyacid cluster ions to the anion exchange resin, or soaking the anion exchange resin in the solution containing W-V polyacid cluster ions.

Figure 4:
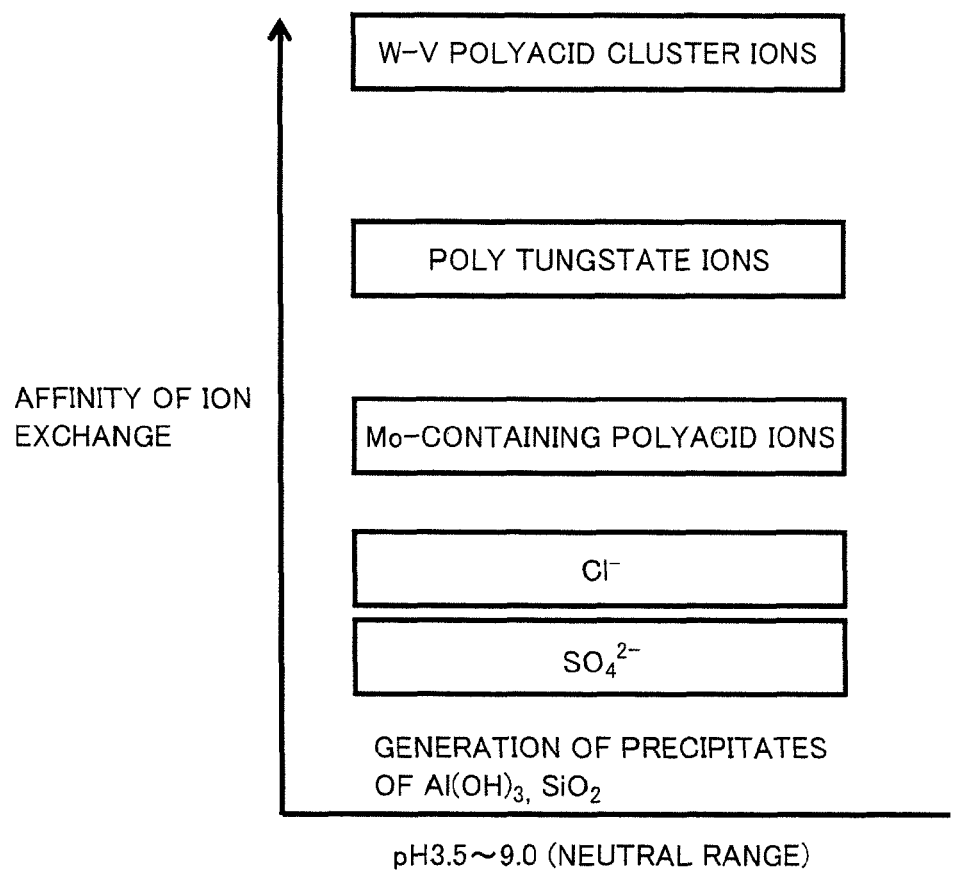
FIG. 4 shows an adsorption affinity of ions to anion exchange resin.

For example, when the pH of the solution is not less than 3.5 and not more than 8, for example as shown in FIG. 4, the W-V polyacid cluster ions show higher affinity to anion exchange resin than tungstate ions. Hence, in the sixth step, for example, the W-V polyacid cluster ions in the solution such as a sodium tungstate aqueous solution can be selectively adsorbed into the anion exchange resin. In this way, vanadium can be separated from the solution such as a sodium tungstate aqueous solution. It should be noted that in the case where the pH of the solution is not less than 3.5 and not more than 8, impurities of Al and Si in the solution form precipitates of Al(OH)$_3$ and $SiO_2$ respectively. Hence, before the sixth step, it is preferable to filter the solution to remove these precipitates for the purpose of producing a high-purity sodium tungstate aqueous solution.

The anion exchange resin can be any resin capable of exchanging and/or adsorbing anions in the solution, such as a strong base anion exchange resin, a weak base anion exchange resin, or a methyl-amino-glucitol resin. Among these, a strong base anion exchange resin containing a quaternary ammonium salt is suitable as the anion exchange resin. Moreover, each of the W-V polyacid cluster ions is large, so that a porous type anion exchange resin designed to have a large pore diameter is preferable because such a porous type anion exchange resin is capable of particularly efficiently removing vanadium.

Next, as shown in a step S7a, the seventh step is performed to recover the discharged solution discharged from the anion exchange resin.

A ratio of the content of vanadium to the content of tungsten (W) in the discharged solution recovered in the seventh step (V/W ratio; V mass/W mass) is preferably $1\times10^{-4}$ or smaller. When the V/W ratio is $1\times10^{-4}$ or smaller, a more high-purity ammonium tungstate aqueous solution tends to be obtained.

Next, as shown in a step S8a, the eighth step is performed to elute mono V acid ions from the anion exchange resin.

In the eighth step, for example, the W-V polyacid cluster ions such as $W_3V_3O_{19}^{5-}$ adsorbed in the anion exchange resin are brought into contact with a basic solution having a pH of, for example, 9 or greater to decompose them into mono V acid ions. In this way, mono V acid ions can be selectively eluted from the anion exchange resin. On this occasion, mono tungstate ions, which are generated as a result of the decomposition of the W-V polyacid cluster ions, are selectively adsorbed into the anion exchange resin because the mono tungstate ions are higher adsorption affinity to anion exchange resin than the mono V acid ions.

An exemplary, usable basic solution having a pH of 9 or greater is a solution obtained by adjusting, to a pH of 9 or greater, the pH of a solution containing at least one selected from a group consisting of a sodium hydroxide (NaOH) aqueous solution, a potassium hydroxide (KOH) aqueous solution, and ammonia solution ($NR_4^-OH$). It should be noted that the ammonia solution is apparently an aqueous solution containing ammonium ions.

Next, as shown in a step S9a, the ninth step is performed to elute mono tungstate ions remaining in the anion exchange resin. In this way, a discharged solution containing the mono tungstate ions is obtained from the anion exchange resin.

In the ninth step, the anion exchange resin having mono tungstate ions remaining therein is exposed to a solution including at least one selected from a group consisting of, for example, chloride ions ($Cl^-$), sulfate ions ($SO_4^{2-}$), and nitrate ions ($NO_3^-$). Accordingly, the mono tungstate ions are eluted from the anion exchange resin, thereby obtaining a solution containing mono tungstate ions.

An exemplary, usable solution in the ninth step is an aqueous solution including at least one selected from a group consisting of a sodium chloride (NaCl) aqueous solution, a potassium chloride (KCl) aqueous solution, and an ammonium chloride ($NH_4Cl$) aqueous solution.

The ninth step also serves as treatment of regenerating the anion exchange resin. Hence, the ninth step allows for repeated use of the anion exchange resin. Further, both the vanadium separated in the eighth step and the tungsten separated in the ninth step can be utilized as resources again. For example, when the discharged solution including mono tungstate ions and obtained through the ninth step is used as the solution containing mono tungstate ions in the first step in the first embodiment, an ammonium tungstate aqueous solution to be obtained using the production method in the first embodiment will be highly purer.

<Third Embodiment>

Each of FIG. 5(a) to FIG. 5(e) shows a schematic view illustrating a method for producing an ammonium tungstate aqueous solution in a third embodiment. A feature of the third embodiment lies in that two anion exchange resins are used to remove molybdenum (Mo).

Figure 5:
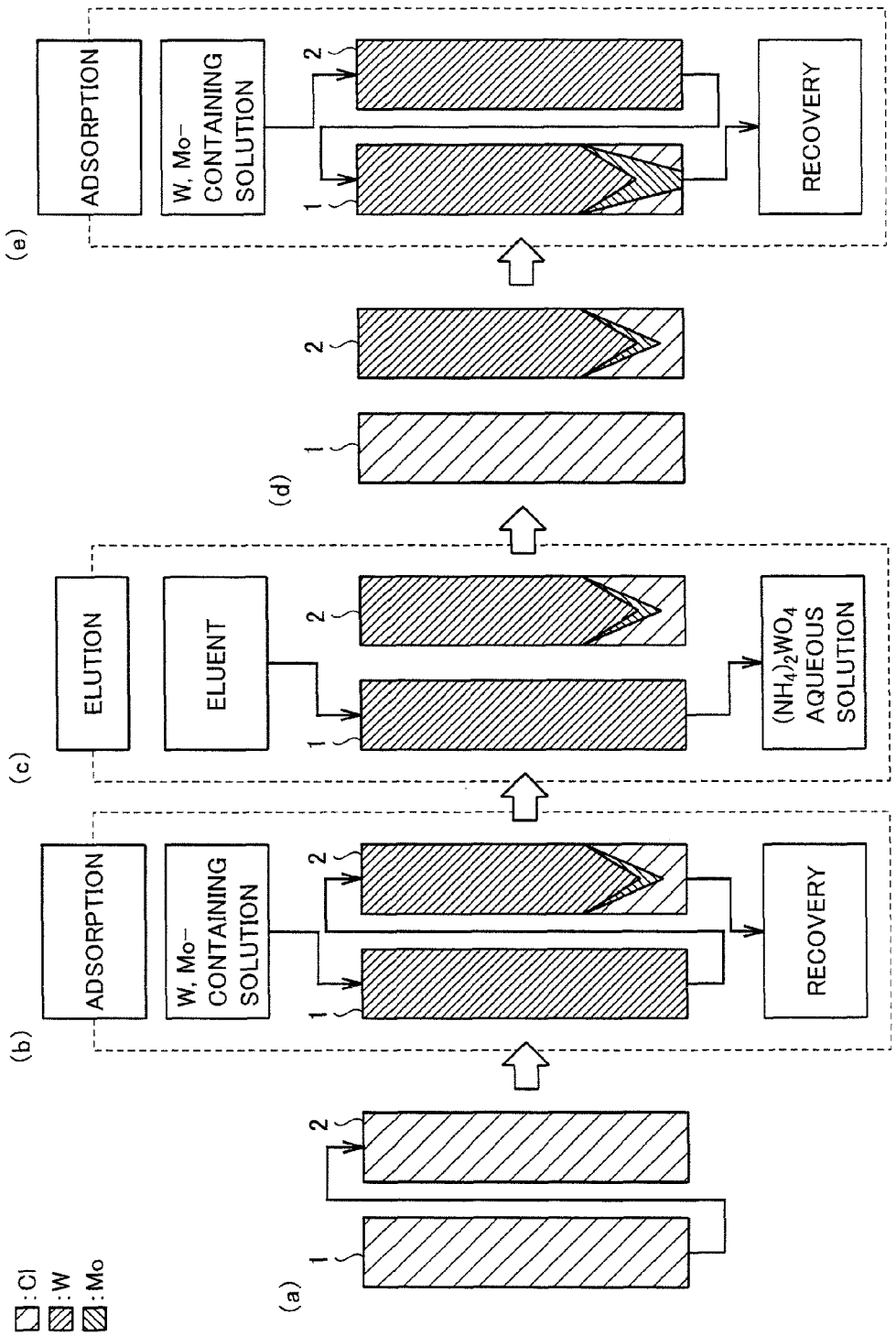

First, as shown in FIG. 5(a), a first anion exchange resin 1 is connected to a second anion exchange resin 2, thereby obtaining one anion exchange resin. Here, first anion exchange resin 1 and second anion exchange resin 2 are connected to each other such that first anion exchange resin 1 is located at the upstream side and second anion exchange resin 2 is located at the downstream side to supply a solution from first anion exchange resin 1 to second anion exchange resin 2. It should be noted that the foregoing anion exchange resin described above can be appropriately used as each of first anion exchange resin 1 and second anion exchange resin 2, for example. In the third embodiment, it will be illustrated that a Cl type anion exchange resin is used for each of first anion exchange resin 1 and second anion exchange resin 2.

Next, as shown in FIG. 5(b), a polyacid solution (illustrated as "W, Mo-containing solution" in FIG. 6) containing poly tungstate ions and poly tungstate ions including molybdenum (for example, ions including W, Mo, and O, such as $W_xMo_yO_z^{\alpha-}$; hereinafter, also referred to as "Mo-containing polyacid ions") is supplied from first anion exchange resin 1 to second anion exchange resin 2. In this way, first anion exchange resin 1 at the upstream side has an adsorption site occupied by poly tungstate ions, and therefore Mo-containing polyacid ions and chloride ions ($Cl^-$) can be forced out to the downstream side of second anion exchange resin 2.

This is due to the following reason, for example. That is, in a pH range in which poly tungstate ions stably exist in a solution such as a pH of not less than 3.5 and not more than 8, the poly tungstate ions have higher adsorption affinity for anion exchange resin than Mo-containing polyacid ions and chloride ions ($Cl^-$) for example as shown in FIG. 4. Accordingly, they are likely to be adsorbed in the upstream side of the anion exchange resin. Thus, the pH of the polyacid solution to be supplied to the anion exchange resin is preferably not less than 3.5 and not more than 8, more preferably, not less than 6 and not more than 7. It should be noted that a solution discharged from second anion exchange resin 2 is recovered. Further, the polyacid solution (W, Mo-containing solution) can be produced by, for example, adding an acid such as sulfuric acid or hydrochloric acid to a solution such as a tungstic acid alkali metal salt aqueous solution containing mono tungstate ions and mono Mo acid ions ($MoO_4^{2-}$), so as to decrease the pH thereof. It is preferable to use sulfuric acid.

Next, as shown in FIG. 5(c), first anion exchange resin 1 and second anion exchange resin 2 are disconnected from each other, thereby separating first anion exchange resin 1 and second anion exchange resin 2 from each other. Then, first anion exchange resin 1 thus separated is supplied with an eluent, which is an aqueous solution containing ammonium ions. Accordingly, an ammonium tungstate (($NH_4)_2WO_4$) aqueous solution is discharged from first anion exchange resin 1.

Here, first anion exchange resin 1 does not have Mo, which is an impurity, adsorbed therein. Accordingly, a high-purity ammonium tungstate aqueous solution is obtained from first anion exchange resin 1.

Further, mono tungstate ions remaining in first anion exchange resin 1 after the elution react with an ammonium chloride aqueous solution in the eluent to exchange ions. Hence, as shown in FIG. 5(d), chloride ions ($Cl^-$) are adsorbed to first anion exchange resin 1. In the following reaction formula, R represents the adsorption site of the anion exchange resin.

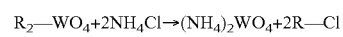

Although the description above has illustrated that the mono tungstate ions are eluted in one stage using, as an eluent, the aqueous solution containing ammonium ions, it is preferable to employ two-stage elution of supplying, as an eluent of the first stage, an aqueous solution containing ammonium ions, and then supplying, as an eluent of a second stage, ammonia solution and a solution including at least one selected from a group including chloride ions, nitrate ions, and sulfate ions. In this case, a recovery ratio of tungsten can be further increased.

For such two-stage elution, it is preferable to employ two-stage elution of supplying basic ammonia solution ($NH_4OH$) as an eluent of the first stage and then supplying a mixed aqueous solution of an ammonium chloride aqueous solution and ammonia solution as an eluent of the second stage ($NH_4Cl+NH_4OH$). In this case, with the ammonia solution being supplied in the first stage, poly tungstate ions adsorbed in the anion exchange resin are decomposed to mono tungstate ions, thereby recovering a certain amount of mono tungstate ions. With the mixed aqueous solution of ammonium chloride aqueous solution and ammonia solution being thereafter supplied in the second stage, mono tungstate ions remaining in the anion exchange resin are recovered and chloride ions are adsorbed into the anion exchange resin, thereby regenerating the anion exchange resin. The anion exchange resin thus regenerated can be reused as each of first anion exchange resin 1 and second anion exchange resin 2. Further, when the two-stage elution is used, generation of crystal can be suppressed during the elution, thereby achieving increased recovery amount of mono tungstate ions. Apart from the mixed aqueous solution of ammonium chloride aqueous solution and ammonia solution ($NH_4Cl+NH_4OH$), the following solution can be used as the eluent in the second stage: a mixed aqueous solution of ammonium sulfate solution and ammonia solution (($NH_4)_2SO_4+NH_4OH$); a mixed aqueous solution of ammonium nitrate aqueous solution and ammonia solution ($NH_4NO_3+NH_4OH$); or the like.

Thereafter, as shown in FIG. 5(e), first anion exchange resin 1 and second anion exchange resin 2 are connected to each other again to form one reconnected anion exchange resin. Here, first anion exchange resin 1 and second anion exchange resin 2 are connected to each other such that second anion exchange resin 2 is located at the upstream side and first anion exchange resin 1 is located at the downstream side to supply a solution from second anion exchange resin 2 to first anion exchange resin 1.

As with FIG. 5(b), a W, Mo-containing solution is supplied from second anion exchange resin 2 to first anion exchange resin 1. In this way, as shown in FIG. 5(e), Mo having been forced out and adsorbed in the downstream end of second anion exchange resin 2 is forced out of first anion exchange resin 1 and is accordingly separated. It should be noted that the solution discharged from first anion exchange resin 1 is recovered.

Thereafter, first anion exchange resin 1 and second anion exchange resin 2 are disconnected from each other, thereby separating first anion exchange resin 1 and second anion exchange resin 2 from each other. Then, in the same manner as above, second anion exchange resin 2 thus separated is supplied with an eluent, which is an aqueous solution containing ammonium ions. In this way, the mono tungstate ions eluted from second anion exchange resin 2 react with ammonium ions in the eluent containing ammonium ions, whereby an ammonium tungstate (($NH_4)_2WO_4$) aqueous solution is discharged from second anion exchange resin 2. Also in this case, a two-stage elution similar to the above may be used.

In this way, in the third embodiment, by repeating the steps of (i) connecting the anion exchange resins to each other, (ii) supplying the W, Mo-containing solution thereto, (iii) disconnecting the anion exchange resins from each other, and (iv) eluting the mono tungstate ions, Mo is separated from the W, Mo-containing solution containing Mo as an impurity, thereby producing a high-purity ammonium tungstate aqueous solution.

Further, when the method of the third embodiment is used in combination with the method(s) of the first embodiment and/or the second embodiment, impurities such as Mo, V, Si, and Al can be removed, thereby producing a further high-purity ammonium tungstate aqueous solution.

In the third embodiment, it has been illustrated that the two anion exchange resins, i.e., first anion exchange resin 1 and second anion exchange resin 2, are connected to each other, but the number of anion exchange resins connected to each other is not limited to two. Further, in the third embodiment, it has been illustrated that for ease of description, the "anion exchange resins" are connected to each other, but "ion exchange resin towers" each having a column filled with an "anion exchange resin" may be connected to each other.

<Fourth Embodiment>

Each of FIG. 6(a) to FIG. 6(e) shows a schematic view illustrating a method for producing an ammonium tungstate aqueous solution in a fourth embodiment. A feature of the fourth embodiment lies in that a solution containing poly tungstate ions and an eluent are supplied to a plurality anion exchange resins connected to one another so as to recover an ammonium tungstate aqueous solution, thereafter an anion exchange resin at the upstream side is installed at the downstream side, and then the same procedure is performed.

First, as shown in FIG. 6(a), a first anion exchange resin 1, a second anion exchange resin 2, and a third anion exchange resin 3 are connected to one another to obtain one anion exchange resin. Here, first anion exchange resin 1, second anion exchange resin 2, and third anion exchange resin 3 are connected to one another such that first anion exchange resin 1 is located at the upstream side, third anion exchange resin 3 is located at the downstream side, and second anion exchange resin 2 is located between first anion exchange resin 1 and third anion exchange resin 3. It should be noted that the foregoing anion exchange resin described above can be appropriately used as each of first anion exchange resin 1, second anion exchange resin 2, and third anion exchange resin 3, for example. In the fourth embodiment, it will be illustrated that a Cl type anion exchange resin is employed as each of first anion exchange resin 1, second anion exchange resin 2, and third anion exchange resin 3.

Figure 6:
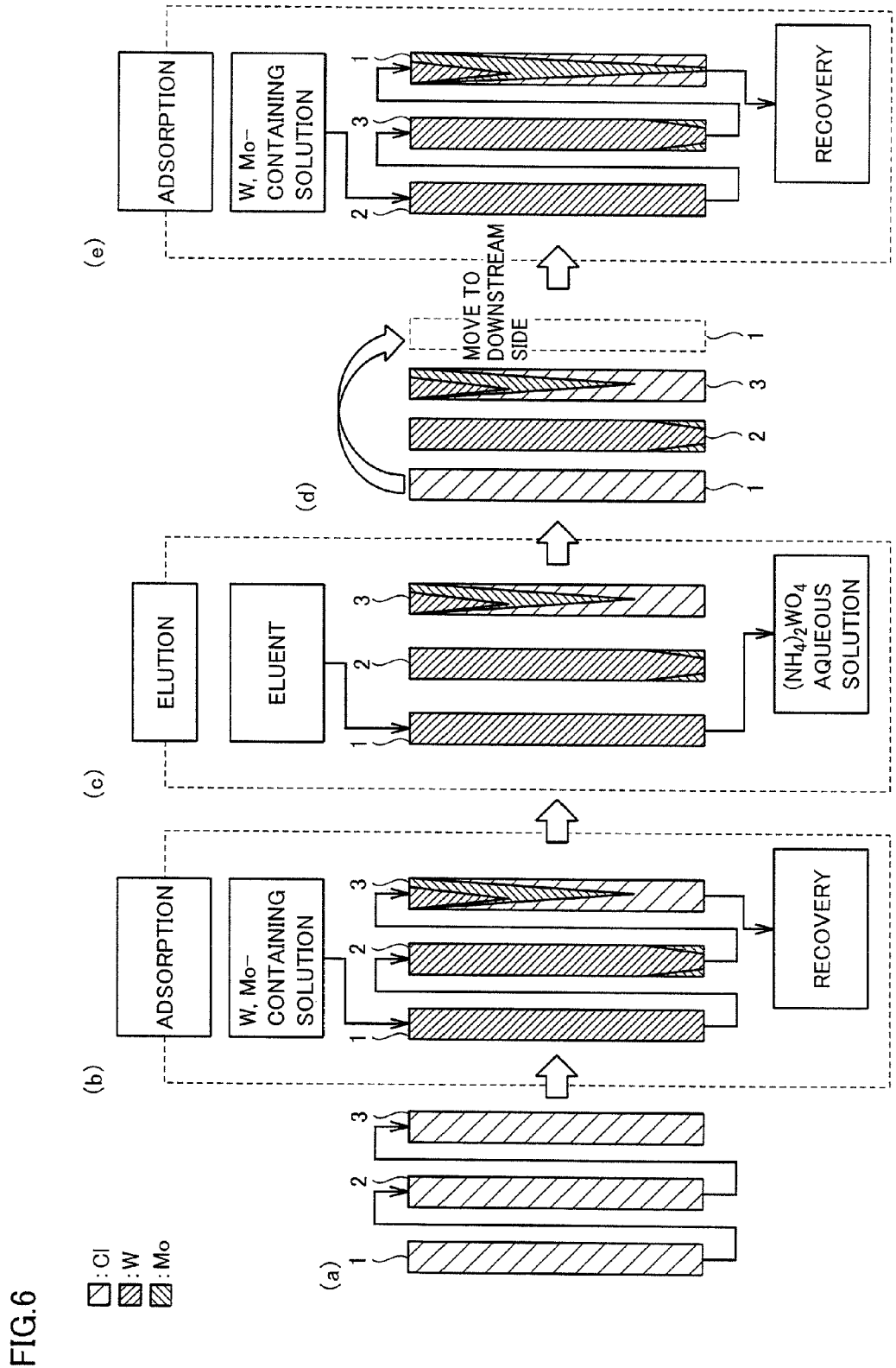

Next, as shown in FIG. 6(b), a solution containing poly tungstate ions and Mo-containing polyacid ions (also illustrated as "W, Mo-containing solution" in FIG. 6) is supplied from the first anion exchange resin 1 side. In this way, first anion exchange resin 1 at the upstream has an adsorption site occupied by poly tungstate ions, and therefore Mo-containing polyacid ions and chloride ions can be forced out from first anion exchange resin 1 to outside thereof. Further, the polyacid solution (W, Mo-containing solution) can be produced by, for example, adding an acid such as hydrochloric acid or sulfuric acid to a solution such as a tungstic acid alkali metal salt aqueous solution containing mono tungstate ions and mono Mo acid ions, so as to decrease the pH thereof. It should be noted that a solution discharged from third anion exchange resin 3 is recovered.

Next, as shown in FIG. 6(c), first anion exchange resin 1, second anion exchange resin 2, and third anion exchange resin 3 are disconnected from one another, thereby separating first anion exchange resin 1, second anion exchange resin 2, and third anion exchange resin 3 from one another. Then, first anion exchange resin 1 thus separated is supplied with an eluent, which is an aqueous solution containing ammonium ions (here, a mixed aqueous solution of basic ammonium chloride aqueous solution and ammonia solution ($NH_4Cl+NH_4OH$)). In this way, a pH environment is provided in which mono tungstate ions can exist more stably than poly tungstate ions. Also, poly tungstate ions can be decomposed to mono tungstate ions, which are simultaneously eluted from first anion exchange resin 1. Then, the mono tungstate ions thus eluted from first anion exchange resin 1 react with ammonium ions in the eluent containing ammonium ions, whereby an ammonium tungstate (($NH_4)_2WO_4$) aqueous solution is discharged from first anion exchange resin 1.

Here, first anion exchange resin 1 does not have Mo, which is an impurity, adsorbed therein. Accordingly, a high-purity ammonium tungstate aqueous solution is obtained from first anion exchange resin 1.

Further, mono tungstate ions remaining in first anion exchange resin 1 after the elution react with an ammonium chloride aqueous solution in the eluent to exchange ions. Hence, as shown in FIG. 7 (d), chloride ions (Cl$^-$) are adsorbed in first anion exchange resin 1. In the following reaction formula, R represents the adsorption site of each anion exchange resin:

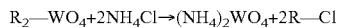

$$R_2-WO_4+2NH_4Cl \rightarrow (NH_4)_2WO_4+2R-Cl$$

Although the description above has illustrated that the mono tungstate ions are eluted in one stage using, as an eluent, the aqueous solution containing ammonium ions, it is preferable to employ two-stage elution of supplying, as an eluent of the first stage, an aqueous solution containing ammonium ions, and then supplying, as an eluent of the second stage, a solution containing at least one selected from a group consisting of chloride ions, nitrate ions, and sulfate ions. In this case, a recovery ratio of tungsten can be further increased.

For such two-stage elution, it is preferable to employ two-stage elution of supplying basic ammonia solution ($NH_4OH$) as an eluent of the first stage and then supplying a mixed aqueous solution of an ammonium chloride aqueous solution and ammonia solution ($NH_4Cl+NH_4OH$) as an eluent of the second stage. In this case, with the ammonia solution being supplied in the first stage, poly tungstate ions adsorbed in the anion exchange resin are decomposed to mono tungstate ions, thereby recovering a certain amount of mono tungstate ions. With the mixed aqueous solution of ammonium chloride aqueous solution and ammonia solution being thereafter supplied in the second stage, mono tungstate ions remaining in the anion exchange resin are recovered and chloride ions are adsorbed into the anion exchange resin, thereby regenerating the anion exchange resin. Further, when the two-stage elution is employed, generation of crystal can be suppressed during the elution, thereby achieving increased recovery amount of mono tungstate ions. Apart from the mixed aqueous solution of ammonium chloride aqueous solution and ammonia solution ($NH_4Cl+NH_4OH$), the following solution can be used as the eluent in the second stage: a mixed aqueous solution of ammonium sulfate solution and ammonia solution (($NH_4)_2SO_4+NH_4OH$); a mixed aqueous solution of ammonium nitrate aqueous solution and ammonia solution ($NH_4NO_3+NH_4OH$); or the like.

Next, as shown in FIG. 6(d), first anion exchange resin 1 thus regenerated as a Cl type anion exchange resin with its adsorption site being occupied by chloride ions is moved to the downstream side.

Then, as shown in FIG. 6(e), first anion exchange resin 1, second anion exchange resin 2, and third anion exchange resin 3 are connected to one another again to form one reconnected anion exchange resin. Here, first anion exchange resin 1, second anion exchange resin 2, and third anion exchange resin 3 are connected to one another again such that second anion exchange resin 2 is located at the upstream side, first anion exchange resin 1 is located at the downstream, and third anion exchange resin 3 is located between second anion exchange resin 2 and first anion exchange resin 1.

Then, a W, Mo-containing solution is supplied from the second anion exchange resin 2 side. In this way, as shown in FIG. 6(e), Mo having been forced out and adsorbed in the downstream end of first anion exchange resin 1 is forced out of first anion exchange resin 1 and is accordingly separated and recovered.

Thereafter, the following steps are performed after the step shown in FIG. 6(e). Specifically, after the step shown in FIG. 6(e), first anion exchange resin 1, second anion exchange resin 2, and third anion exchange resin 3 are disconnected from each other, and then second anion exchange resin 2 having an adsorption site occupied by poly tungstate ions is supplied with an eluent (for example, ($NH_4Cl+NH_4OH$)) composed of an aqueous solution containing ammonium ions. In this way, an ammonium tungstate aqueous solution is discharged from second anion exchange resin 2 while regenerating second anion exchange resin 2 as a Cl type anion exchange resin. Also in this case, a two-stage elution similar to the above may be used.

Then, second anion exchange resin 2 thus regenerated is moved to the downstream side. Then, third anion exchange resin 3, first anion exchange resin 1, and second anion exchange resin 2 are connected to one another again in this order. Then, a W, Mo-containing solution is supplied from the third anion exchange resin 3 side. In this way, third anion exchange resin 3 has an adsorption site occupied with poly tungstate ions.

Thereafter, first anion exchange resin 1, second anion exchange resin 2, and third anion exchange resin 3 are disconnected from one another. Then, third anion exchange resin 3 thus having its adsorption site occupied by poly tungstate ions is supplied with an eluent (for example ($NH_4Cl+NH_4OH$)). Accordingly, an ammonium tungstate aqueous solution is discharged from third anion exchange resin 3 while regenerating third anion exchange resin 3 as a Cl type anion exchange resin. Also in this case, a two-stage elution similar to the above may be used.

Next, third anion exchange resin 3 thus regenerated is moved to the downstream side. Then, first anion exchange resin 1, second anion exchange resin 2, and third anion exchange resin 3 are connected to one another in this order. Then, a W, Mo-containing solution is supplied from the first anion exchange resin 1 side.

As described above, the anion exchange resins regenerated as Cl type anion exchange resins after the recovery of the ammonium tungstate aqueous solutions are sequentially installed at the downstream side and are therefore used in a merry-go-round manner. In this way, while removing Mo, a high-purity ammonium tungstate aqueous solution can be produced.

In the fourth embodiment, it has been illustrated that the three anion exchange resins, i.e., first anion exchange resin 1, second anion exchange resin 2, and the third anion exchange resin are connected to one another, but the number of anion exchange resins connected to one another is not limited to three.

The fourth embodiment is the same as the third embodiment apart from the description above, and is therefore not described further.

EXAMPLES

Example 1

(1) Adsorption of Polyacid Ions in $H_2SO_4$ System

First, a sodium tungstate aqueous solution having a pH of 9 or greater (sample 1) was prepared. A sodium polytungstate aqueous solution (sample 2) was prepared by adding hydrochloric acid to sample 1 for adjustment to a pH of 6. A sodium polytungstate aqueous solution (sample 3) was prepared by adding sulfuric acid to sample 1 for adjustment to a pH of 6. Further, $WO_3$ concentration (hereinafter, the "$WO_3$ concentration" will be referred to as "W concentration" unless otherwise stated) of each of the sodium polytungstate aqueous solutions of sample 2 and sample 3 having been through the pH adjustments was adjusted to 70 g/L (70 g of $WO_3$ was contained per liter of the sodium polytungstate aqueous solution).

Next, samples 1 to 3 thus prepared were respectively supplied to resin packed towers each having a glass column filled with a Cl type strong base anion exchange resin (glass column having an inner diameter of 26 mm and filled with 350 mL of the anion exchange resin). Here, a space velocity for the supply of solution was adjusted to 3.9 $hr^{-1}$.

FIG. 7 shows a relation between a ratio of an amount of supply of each of samples 1 to 3 relative to a resin volume of each of the anion exchange resins and a degree of saturation for each of the anion exchange resins when the solutions were supplied under the above-described conditions. In FIG. 7, the vertical axis represents a degree of saturation (%) of the solution discharged from each of the anion exchange resins, whereas the horizontal axis represents the ratio of the amount of supply of each of samples 1 to 3 relative to the resin volume of each of the anion exchange resins (i.e., time elapses with an increase in the horizontal axis; the same applies to the description below). Further, the degree of saturation (%) represents a concentration C of W contained in the discharged solution, assuming that an initial concentration $C_0$ of W in each of the aqueous solutions of samples 1 to 3 is 100.

As shown in FIG. 7, sample 3 having its pH adjusted using sulfuric acid achieved greatly increased break-through point and adsorption capacity as compared with those of sample 1 and sample 2. Sample 3 achieved a saturated adsorption amount approximately four times as large as that of sample 1 and approximately 1.5 times to twice as large as that of sample 2.

From the results shown in FIG. 7, it is considered that ionic species different from that in sample 2 was formed in sample 3. In consideration of the adsorption ability to the anion exchange resin, it is inferred that the ionic species of sample 3 was $W_3S_yO_z^{2-}$ or the like.

(2) Elution of Polyacid Ions in $H_2SO_4$ System (a) One-Stage Elution

Sample 3 prepared as described above was supplied to a resin packed tower having a glass column filled with a Cl type strong base anion exchange resin (glass column having an inner diameter of 26 mm and filled with 350 mL of the anion exchange resin). The supply of solution was performed at a space velocity SV (SV is a unit representative of flow rate and is a value obtained by dividing the volume flow rate by the resin volume; the same applies to the description below) of 6 $hr^{-1}$ until the adsorption was saturated. The adsorption was assumed to be saturated when the discharged solution having passed through the resin packed tower had a W concentration as large as that in sample 3.

Next, the anion exchange resin with saturated adsorption was exposed to ammonia solution having an ammonia concentration of 2 mol/L, thereby eluting mono tungstate ions therefrom.

Then, the W concentration (g/L) of the discharged solution discharged from the resin packed tower was calculated in accordance with an ICP atomic emission spectroscopy method. A result thereof is shown in FIG. 8. FIG. 8 shows a relation between the W concentration in the discharged solution and the ratio of the amount of supply of sample 3 relative to the resin volume of the anion exchange resin. It should be noted that in FIG. 8, the vertical axis represents the W concentration (g/L) in the discharged solution, whereas the horizontal axis represents the ratio of the amount of supply of sample 3 relative to the resin volume of the anion exchange resin.

It was confirmed that as the amount of supply of sample 3 was increased, the W concentration was changed in a favorable curve as shown in FIG. 8. In the case where the pH adjustment had been done using hydrochloric acid, use of 2 mol/L of ammonia solution resulted in generation of a precipitate. In contrast, in the case where the pH adjustment had been done using sulfuric acid, use of ammonia solution having a low concentration (2 mol/L) did not result in generation of a precipitate of $(NH_4)_{10}W_{12}O_{41}$ while achieving elution of mono tungstate ions. This indicates that the ionic species formed as a result of the pH adjustment with sulfuric acid is more stable in the discharged solution than the ionic species formed as a result of the pH adjustment with hydrochloric acid.

(b) Two-Stage Elution

Two-stage elution was performed in the following manner. That is, a resin packed tower filled with a Cl type strong base anion exchange resin having a degree of saturation of substantially 100% as a result of circulated adsorption with poly tungstate ions was supplied with (i) ammonia solution (ammonia concentration: 2 mol/L) and (ii) a mixed aqueous solution of ammonium chloride aqueous solution (ammonium chloride concentration: 2.7 mol/L) and ammonia solution (ammonia concentration: 2 mol/L) in this order. Each of the supply of the ammonia solution and the supply of the mixed aqueous solution was performed under the condition that space velocity SV=3 $hr^{-1}$ (LV=51 cm/hr).

Then, the W concentration (g/L) of the discharged solution discharged from the resin packed tower was calculated in accordance with the ICP atomic emission spectroscopy method. From the calculation result, an elution ratio (%) (ratio of elution of poly tungstate ions adsorbed in the anion exchange resin) was calculated. A result thereof is shown in FIG. 9. FIG. 9 shows a relation between a ratio of an amount of supply of the solution having passed through the resin packed tower relative to the resin volume of the anion exchange resin and each of the W concentration in the discharged solution and the elution ratio. In FIG. 9, the vertical axis represents the W concentration (g/L) in the discharged solution and the elution ratio (%), whereas the horizontal axis represents the ratio of the amount of supply of the solution having passed through the resin packed tower relative to the resin volume of the anion exchange resin. Further, the broken line in FIG. 9 represents a change of W concentration (g/L) in the discharged solution, whereas the solid line therein represents a change of the elution ratio (%).

As shown in FIG. 9, the elution ratio after the above-described two-stage elution was substantially 100%. Thus, it was confirmed that poly tungstate ions adsorbed in the anion exchange resin having a degree of saturation of substantially 100% could be eluted substantially completely. This result indicates that poly tungstate ions can be decomposed completely to mono tungstate ions even in the case where ammonia solution having a low ammonia concentration of approximately 2 mol/L is used for the elution of the first stage.

(c) Adsorption-Elution Cycle Employing Only Elution with Ammonia Solution

First, a sodium tungstate aqueous solution having a pH of 9 or greater and having a W concentration of 100 g/L is provided with sulfuric acid for adjustment to a pH of 6.5.

Next, the aqueous solution thus having the adjusted pH was supplied to a resin packed tower having a glass column filled with a $SO_4$ type strong base anion exchange resin (glass column having an inner diameter of 26 mm and filled with 450 mL of the anion exchange resin). Here, a space velocity SV for the supply of solution was adjusted to 6 $hr^{-1}$.

FIG. 10 shows a relation between a ratio of an amount of supply of the aqueous solution when supplied under the above-described conditions relative to a resin volume of the anion exchange resin and each of concentration (g/L) of W contained in the aqueous solution discharged from the anion exchange resin and monomer-based adsorption ratio (%). In FIG. 10, the vertical axis represents each of the W concentration (g/L) and the monomer-based adsorption ratio (%), whereas the horizontal axis represents the ratio of the amount of supply of the aqueous solution relative to the resin volume of the anion exchange resin. In FIG. 10, the term "W concentration (g/L)" refers to the concentration (g/L) of W contained in the aqueous solution discharged from the anion exchange resin. The term "monomer-based adsorption ratio (%)" refers to a ratio (%) of the number of actually adsorbed tungsten atoms relative to the number of the tungsten atoms assuming that all the mono tungstate ions are adsorbed in an adsorption-permitted site of the anion exchange resin. The monomer-based adsorption ratio (%) can be calculated by finding a quotient of the amount of tungsten adsorbed in the resin and the exchange capacity thereof for mono tungstate ions. The exchange capacity for mono tungstate ions is calculated from an ion exchange capacity of a resin with the same volume.

From the result shown in FIG. 10, it can be understood that by adjusting the pH of the aqueous solution using sulfuric acid to 6.5, tungsten can be adsorbed with very high efficiency. However, with the amount of supply until the breakthrough point, the monomer-based adsorption ratio is approximately 160%. Thus, the ion exchangeable amount of the anion exchange resin cannot be sufficiently utilized. This tendency will be more noticeable when the tungsten oxide concentration (W concentration) in the aqueous solution is increased. In view of this, in order to more efficiently adsorb tungsten by supplying a high-concentration sodium tungstate aqueous solution, it was examined to employ a manner of circulated adsorption in which an aqueous solution discharged from the resin packed tower is provided with sulfuric acid to adjust the pH thereof to 6.5 and then is supplied to the resin packed tower again.

FIG. 11 shows a relation between a circulation time (min) and each of the W concentration (g/L) and monomer-based adsorption ratio (%) actually adsorbed to the anion exchange resin when performing the circulated adsorption under the same conditions as above except that a sodium tungstate aqueous solution having a W concentration of 130 g/L was used. In FIG. 11, the vertical axis represents each of the W concentration (g/L) and the monomer-based adsorption ratio (%), whereas the horizontal axis represents the circulation time (min). Further, the W concentration (g/L) in FIG. 11 represents W concentration (g/L) in the circulating solution.

From the result shown in FIG. 11, it is understood that the circulated adsorption allows for adsorption of tungsten into the anion exchange resin with reduced loss of tungsten in the aqueous solution. Further, the circulated adsorption causes no great changes in the amount of adsorption of tungsten into the anion exchange resin and in loss of tungsten even when the W concentration in the aqueous solution is increased. This results in reduced amount of usage of water for producing the sodium tungstate aqueous solution by dissolving a cemented carbide of a cutting tool or the like with a molten salt such as sodium nitrate and then dissolving it with water. This is presumably due to the following reason. That is, the affinity of ion exchange of the polyacid W ions is higher in the anion exchange resin than sulfate ions also existing in the aqueous solution. Hence, polyacid W ions adsorbed therein once are less likely to exchange ions with the sulfate ions, thereby increasing the amount of tungsten adsorbed.

Further, an aqueous solution, prepared by adjusting pH of a sodium tungstate aqueous solution having a W concentration of 120 g/L by means of sulfuric acid to 6.5, was supplied, without the circulated adsorption, to a resin packed tower filled with a $WO_4$ type anion exchange resin, under the condition that space velocity SV=3 $hr^{-1}$. Then, a relation was examined between a ratio of an amount of supply of the aqueous solution relative to a resin volume of the anion exchange resin and each of W concentration (g/L) and monomer-based adsorption ratio (%) actually adsorbed in the anion exchange resin. A result thereof is shown in FIG. 12. In FIG. 12, the vertical axis represents each of the W concentration (g/L) and the monomer-based adsorption ratio (%), whereas the horizontal axis represents the ratio of the amount of supply of the aqueous solution relative to the resin volume of the anion exchange resin. Further, the W concentration (g/L) in FIG. 12 represents concentration (g/L) of W contained in the aqueous solution discharged from the anion exchange resin.

As shown in FIG. 12, it was confirmed that as the amount of supply was increased, the amount of adsorption of poly tungstate ions in the anion exchange resin was increased. In this case, it is considered that mono tungstate ions adsorbed in the anion exchange resin were eluted from the anion exchange resin to result in loss of a large amount of tungsten.

In contrast, in the circulated adsorption, the aqueous solution discharged from the resin packed tower is supplied again to the resin packed tower. Hence, the ionic species eluted from the resin packed tower may be mono tungstate ions. Namely, even when the initial type of ions of the anion exchange resin filling the resin packed tower is $WO_4$ type rather than Cl type or $SO_4$ type, the loss of tungsten can be reduced.

Further, for example, as shown in FIG. 9, approximately ⅔ of the amount of mono tungstate ions when adjusting the pH using sulfuric acid were eluted as a result of decomposing poly tungstate ions through ammonia solution in the first stage. After the elution through the ammonia solution in the first stage, mono tungstate ions were adsorbed in the anion exchange resin. Hence, it is considered that the circulated adsorption of poly tungstate ions in the anion exchange resin of $WO_4$ type established a cycle of adsorption and elution. In this cycle, only ammonia solution can be used as the eluent. Hence, an ammonium chloride aqueous solution, which is expensive, does not need to be used, thus achieving significant reduction of cost of chemical agent for the eluent.

A sodium tungstate aqueous solution having a W concentration of 120 g/L was provided with sulfuric acid to adjust pH thereof to 6.5, thereby preparing an aqueous solution. The aqueous solution thus prepared was circulated and adsorbed in a $WO_4$ type anion exchange resin that fills a resin packed tower, under the condition that space velocity SV=6 $hr^{-1}$. FIG. 13 shows a relation a circulation time (min) and each of W concentration (g/L) and monomer-based adsorption ratio (%) actually adsorbed in the anion exchange resin, on this occasion. In FIG. 13, the vertical axis represents each of the W concentration (g/L) and the monomer-based adsorption ratio (%), whereas the horizontal axis represents the circulation time (min). Further, the W concentration (g/L) of FIG. 13 represents W concentration (g/L) in the circulating solution. The circulated adsorption was started with a $WO_4$ type anion exchange resin being used as the anion exchange resin.

As shown in FIG. 13, also in the circulated adsorption employing the $WO_4$ type anion exchange resin, it was confirmed that the circulated adsorption provided the same behavior as that in the case where the circulated adsorption with the $SO_4$ type anion exchange resin was employed as shown in FIG. 11.

The resin packed tower filled with the anion exchange resin having poly tungstate ions adsorbed therein was supplied with ammonia solution having an ammonia concentration of 2 mol/L, under the condition that space velocity SV=6 $hr^{-1}$. FIG. 14 shows a relation between a ratio of an amount of supply relative to a resin volume of the anion exchange resin and the W concentration (g/L) of a discharged solution discharged from the resin packed tower, on this occasion.

As shown in FIG. 14, as the amount of supply was increased, the W concentration was changed in a favorable curve. A substantial amount of adsorption/elution thereof to/from the anion exchange resin was greater by approximately 140% than that in the case of mono tungstate ions.

Also in the case where sulfuric acid is added to a sodium tungstate aqueous solution to adjust the pH thereof to not less than 3.5 and not more than 8, in particular, not less than 6 and not more than 7, it is considered that a result in the experiment will be the same as above.

Example 2

(1) Specific Example of Method of Separating Vanadium from Tungsten Sodium Aqueous Solution A sodium tungstate aqueous solution was prepared which contained W derived from a cemented carbide scrap containing vanadium. The sodium tungstate aqueous solution contained W at a concentration of 35 g/L, contained vanadium at approximately 110 mg/L, and had a pH of 12.

This sodium tungstate aqueous solution was supplied with 10N hydrochloric acid to adjust the pH thereof to 8, thereby generating W-V polyacid cluster ions.

The aqueous solution thus having its adjusted pH of 8 was supplied in a room temperature at a flow rate of SV=20 $hr^{-1}$ (12 ml/min) to 50 ml of a porous type strong base anion exchange resin (Cl type diaion PA308 (provided by Mitsubishi Chemical Corporation)) from above. The W concentration and vanadium (V) concentration of a discharged solution accordingly discharged from the anion exchange resin were measured in accordance with the ICP atomic emission spectroscopy method. From results of the measurement, there were calculated respective degrees of saturation thereof in the discharged solution (respective concentrations C of W and V in the discharged solution when assuming that respective initial concentrations $C_0$ of W and V were 100 in the aqueous solution having the adjusted pH of 8). A result thereof is shown in FIG. 15. The vertical axis of FIG. 15 shows each of the degrees of saturation ($C/C_0$), whereas the horizontal axis shows a ratio of an amount of supply of the aqueous solution relative to a resin volume of the anion exchange resin.

As shown in FIG. 15, a range of 0 to 50 for the amount of supply/resin volume in the horizontal axis of FIG. 15 corresponds to a portion for the sodium tungstate aqueous solution purified by removing vanadium therefrom. The sodium tungstate aqueous solution thus purified was recovered at a recovery amount of approximately 4 L. Further, in a range of 2.2 L from 0.3 L to 2.5 L after the start of supply of the aqueous solution, the W concentration in the discharged solution was the same as the W concentration that the aqueous solution had before the supply thereof. A ratio (V/W ratio) of the V concentration to the W concentration (here "W concentration" rather than "$WO_3$ concentration") in the discharged solution was $3.2 \times 10^{-5}$ or smaller.

Next, sodium tungstate aqueous solutions having W concentrations (g/L) and V concentrations (mg/L) as shown in Table 1 were adjusted using an acid to have pH values shown in Table 1. Thereafter, each of the aqueous solutions was supplied to approximately 50 ml of a porous type strong base anion exchange resin (Cl type diaion PA308 (provided by Mitsubishi Chemical Corporation)). An amount of supply thereof was twenty times as large as the resin volume thereof. The supply was performed under the condition that space velocity SV=20 $hr^{-1}$. Then, the W concentration and V concentration of a discharged solution having passed through the porous type strong base anion exchange resin were measured using the ICP atomic emission spectroscopy method (ICP-AES). Determined from results of the measurement was a ratio (V/W ratio) of the V concentration to the W concentration (here, "W concentration" rather than "$WO_3$ concentration") in the discharged solution. A result thereof is shown in Table 1.

It should be noted that the preparation and adjustment of pH of the sodium tungstate aqueous solution were performed in the following procedures (i) to (iii):

(i) a sodium tungstate aqueous solution was prepared by dissolving sodium tungstate with water;

(ii) the W concentration (g/L) and V concentration (mg/L) of the sodium tungstate aqueous solution (solution containing $WO_4^{2-}$ and $VO_3^{-}$) were measured in accordance with ICP-AES; and (iii) the pH thereof was adjusted and was checked using a pH meter, in order to obtain a sodium tungstate aqueous solution (solution containing $WO_4^{2-}$ and $W_3V_3O_{19}^{5-}$).

TABLE 1

|  | W Concentration (g/L) | V Concentration (mg/L) | pH Value | V/W Ratio ($\times 10^{-5}$) |
|---|---|---|---|---|
| Sample 4 | 35 | 110 | 8.2 | 3.40 |
| Sample 5 | 35 | 110 | 8.0 | 3.20 |
| Sample 6 | 35 | 110 | 7.8 | 2.85 |
| Sample 7 | 35 | 110 | 7.6 | 2.72 |
| Sample 8 | 35 | 110 | 7.5 | 2.71 |
| Sample 9 | 35 | 110 | 7.0 | 2.70 |
| Sample 10 | 20 | 110 | 8.0 | 2.75 |
| Sample 11 | 100 | 110 | 8.0 | 3.30 |
| Sample 12 | 150 | 110 | 8.0 | 5.70 |
| Sample 13 | 35 | 1000 | 8.0 | 6.20 |
| Sample 14 | 35 | 15 | 8.0 | 3.10 |
| Sample 15 | 35 | 110 | 8.5 | 100 |
| Sample 16 | 35 | 110 | 8.7 | 157 |
| Sample 17 | 35 | 110 | 6.0 | 102 |
| Sample 18 | 200 | 110 | 8.0 | 35.7 |
| Sample 19 | 200 | 1000 | 8.0 | 245 |

As apparent from comparison among the V/W ratios of samples 4 to 9 and 15 to 17 in Table 1, the pH of the sodium tungstate aqueous solution is preferably adjusted to fall within a range of not less than 7 and not more than 9, more preferably, not more than 8.2 in order to reduce the V/W ratio in each discharged solution. This is presumably due to the following reason. That is, in samples 15 and 16, the pH was 8.5 or greater. Hence, decomposition of W-V polyacid cluster ions took place to result in insufficient removal of V. Further, in sample 17, the pH was decreased to 6.0 and the V/W ratio of the discharged solution was high. This is presumably because poly tungstate ions were formed when the pH of the sodium tungstate aqueous solution was decreased to 6.0. The affinity of ion exchange of the poly tungstate ions is higher than that of the mono tungstate ions. Such an ionic species was included in the aqueous solution. Hence, W-V polyacid cluster ions adsorbed in the resin were forced out by the poly tungstate ions and were discharged therefrom.

Further, as apparent from comparison among V/W ratios of samples 10 to 12 and 18 to 19 in Table 1, the V/W ratio of the discharged solution was low when the sodium tungstate aqueous solution before being supplied had a W concentration (g/L) of not less than 20 g/L and not more than 150 g/L. This is presumably due to the following reason. That is, when an aqueous solution contains tungsten at a high concentration, poly tungstate ions are generated even under the condition that the pH is 8.0. The affinity of ion exchange of the poly tungstate ions is higher than that of the mono tungstate ions. Such an ionic species was included in the aqueous solution. Hence, W-V polyacid cluster ions adsorbed in the resin were discharged therefrom.

Further, when the V concentration in the sodium tungstate aqueous solution before being supplied is very high such as 1000 (mg/L) as shown in sample 13 of Table 1 and the W concentration in the sodium tungstate aqueous solution before being supplied is very low such as 15 (mg/L) as shown in sample 14, it can be understood that V can be removed efficiently as long as the sodium tungstate aqueous solution before being supplied has a W concentration (g/L) falling within a range of not less than 20 g/L and not more than 150 g/L.

Two-stage elution was performed such that the anion exchange resin having W-V polyacid cluster ions adsorbed therein was supplied with a NaOH aqueous solution, and then supplied with a NaCl aqueous solution. FIG. 16 shows respective changes of the W concentration (g/L) and V concentration (mg/L) in a discharged solution discharged from the anion exchange resin on this occasion. The vertical axis of FIG. 16 represents each of the W concentration (g/L) and the V concentration (mg/L), whereas the horizontal axis represents a ratio of an amount of supply to a resin volume of the anion exchange resin. It should be noted that adsorption conditions and elution conditions are described below.

<Adsorption Conditions>

Aqueous solution: an aqueous solution prepared by adjusting the pH of a sodium tungstate aqueous solution to 8.

Anion exchange resin: a porous type strong base anion exchange resin (Cl type diaion PA308 (provided by Mitsubishi Chemical Corporation))

SV (aqueous solution passing through the anion exchange resin per hour/resin volume): 20 hr$^{-1}$ Resin volume: 30 ml Amount of supply: 3 L W concentration in the aqueous solution: 35 g/L (152 mmol/L)

V concentration in the aqueous solution: 200 mg/L (4 mmol/L)

<Elution Conditions>

(a) First Stage

NaOH concentration in a NaOH aqueous solution: 1 mol/L

Amount of supply of the NaOH aqueous solution: 900 mL

SV of the NaOH aqueous solution: 2 hr$^{-1}$ (b) Second Stage

NaCl concentration in a NaCl aqueous solution: 2.5 mol/L

An amount of supply of the NaCl aqueous solution: 900 mL

SV of the NaCl aqueous solution: 2 hr$^{-1}$

A molar ratio of W ($WO_3$) and V in the aqueous solution used for the above-described adsorption was approximately 150:4. On the other hand, W ($WO_3$) and V in the discharged solution were completely separated. Accordingly, the aqueous solution containing V eluted by the NaOH aqueous solution as well as the aqueous solution containing W ($WO_3$) eluted by the NaCl aqueous solution can be respectively high-purity aqueous solutions containing V and W reusable.

The W-V polyacid cluster ions adsorbed in the anion exchange resin can be decomposed again into mono tungstate ions and mono V acid ions in a basic solution having a pH adjusted to 8.5 or greater, for example. Thus, by soaking, in the basic solution, the anion exchange resin having W-V polyacid cluster ions adsorbed therein, or by supplying the basic solution thereto, the W-V polyacid cluster ions can be decomposed, thereby eluting W and V from the anion exchange resin. Further, in order to elute V remaining in the anion exchange resin, an aqueous solution containing an anionic species represented by OH$^-$ is supplied to the anion exchange resin to attain substantially 100% elution of V. An exemplary aqueous solution containing an anionic species is NaOH, KOH, NH$_4$OH, or the like.

On the other hand, W is never eluted by OH from the anion exchange resin, and remains in the anion exchange resin. This anion exchange resin is then supplied with an aqueous solution containing an anionic species represented by Cl$^-$, such as NaCl, KCl, or NH$_4$Cl, to achieve substantially 100% elution of W therefrom, thereby obtaining an aqueous solution in which W is separated from V at a high degree. Hence, V removed in this way can be reused as a resource.

(2) Selection of Anion Exchange Resin

For the anion exchange resin, a strong base anion exchange resin is suitable. This is because the affinity of ion exchange of $W_3V_3O_{19}^{5-}$ for the strong base anion exchange resin is much higher than that of $WO_4^{2-}$. Using such a characteristic, W and V are separated.

V is preferably adsorbed into the anion exchange resin by supplying the sodium tungstate aqueous solution containing V to the resin packed tower filled with the anion exchange resin to bring the aqueous solution into contact with the anion exchange resin. Alternatively, the basic anion exchange resin may be, for example, soaked in a container filled with the sodium tungstate aqueous solution containing V.

W-V polyacid cluster ions in the aqueous solution, such as $W_3V_3O_{19}^{5-}$, are selectively adsorbed into the anion exchange resin. In this way, the V/W (here "W" rather than "$WO_3$") ratio of the discharged solution obtained by means of the passage through the anion exchange resin can become 1.0× 10$^{-4}$ or smaller, for example.

The sodium tungstate aqueous solution from which V has been removed as described above is converted into an ammonium tungstate aqueous solution, and is then enriched to obtain a high-purity ammonium paratungstate crystal, which can be used as a source material for various types of tungsten materials.

(3) Contact with Anion Exchange Resin

A volume required for the anion exchange resin differs depending on a type of the anion exchange resin and the V concentration in the sodium tungstate aqueous solution, but when, for example, the V concentration in the sodium tungstate aqueous solution is 100 mg/L (2 m mol/L) and the exchange capacity of the anion exchange resin is 1 meq/ml, approximately 3000 ml of the sodium tungstate aqueous solution can be treated with 10 ml of the anion exchange resin. This is because the ion exchange capacity of the anion exchange resin for $W_3V_3O_{19}^{5-}$ is 6 mmol for 10 ml thereof.

Accordingly, selective removal of V can be completed by supplying the aqueous solution to the anion exchange resin having a volume approximately 1/60 of the volume of the solution to be treated. There is no large difference between a case where the solution is supplied to the anion exchange resin from above and a case where it is supplied from below. Also, the supply velocity does not have a great influence over treatment efficiency.

Example 3

As shown in FIG. 17, a sodium tungstate aqueous solution (sample solution) having a W concentration of 116 g/L and having a Mo concentration of 356 ppm (Mo mass/W mass (here, the mass of "W" rather than the mass of "$WO_3$")) and having a pH of 6.5 was supplied at a space velocity of SV=2 $hr^{-1}$ to an ion exchange resin tower 21 having a glass column having a height of 1 m and filled with a Cl type strong base anion exchange resin (Cl type strong base anion exchange resin (trade name: IRA900J provided by Rohm and Haas Company). Then, the Mo concentration (mg/L) of a discharged solution accordingly discharged from ion exchange resin tower 21 was measured in accordance with the ICP-AES. From a result of the measurement, a Mo removal ratio (%) was calculated. A result thereof is shown in FIG. 18. The vertical axis of FIG. 18 represents each of the Mo concentration (mg/L) in the discharged solution and the Mo removal ratio (%), whereas the horizontal axis represents a ratio of an amount of supply of the sample solution relative to a resin volume thereof.

As shown in FIG. 18, in example 3, it was confirmed that Mo can be removed only by supplying the solution to the anion exchange resin. It should be noted that when the pH of the sample solution was 6.5, poly tungstate ions and Mo-containing polyacid ions were presumably generated in the sample solution. Further, from the result above, it is considered that when the pH of the sample solution fell within a range of at least not less than 3.5 and not more than 8, in particular, not less than 6 and not more than 7, poly tungstate ions and Mo-containing polyacid ions were generated in the sample solution.

Example 4

As shown in FIG. 19, a sodium tungstate aqueous solution (sample solution) having a W concentration of 120 g/L and a Mo concentration of 300 ppm (Mo mass/W mass (here, mass of "W" rather than the mass of "$WO_3$")) and having a pH of 6.5 was supplied at a space velocity SV=2 $hr^{-1}$ to two ion exchange resin towers 31, 32 connected to each other and each having a glass column having a height of 1 m and filled with a Cl type strong base anion exchange resin (Cl type strong base anion exchange resin (trade name: IRA900J provided by Rohm and Haas Company)).

Then, the Mo concentration in a discharged solution discharged from second ion exchange resin tower 32 was measured. The measurement was combined with data of FIG. 18 so as to determine a degree of Mo saturation ($C/C_0$) in first ion exchange resin tower 31; a degree of Mo saturation ($C/C_0$) in second ion exchange resin tower 32; and a degree of saturation of W ($C/C_0$) in total of first and second ion exchange resin towers 31, 32. A result thereof is shown in FIG. 20 and FIG. 21. It should be noted that each of the degrees of saturation represents a ratio of the Mo concentration or the W concentration (C) in the discharged solution discharged from each of ion exchange resin towers 31, 32 relative to the Mo concentration or the W concentration ($C_0$) in the sample solution.

FIG. 20 shows a relation between the degree of Mo saturation ($C/C_0$) in each of first ion exchange resin tower 31 and second ion exchange resin tower 31, and the ratio of the amount of supply relative to the resin volume. The vertical axis of FIG. 20 represents the degree of Mo saturation ($C/C_0$), whereas the horizontal axis represents the ratio of the amount of supply relative to the resin volume. Further, the degree of Mo saturation ($C/C_o$) in the vertical axis of FIG. 20 exceeds 1 and the Mo concentration in the discharged solution is higher than the Mo concentration in the sample solution. This indicates that Mo is removed from the sample solution.

FIG. 21 shows a relation between each of the degree of Mo saturation ($C/C_0$) of first ion exchange resin tower 31 and the degree of W saturation ($C/C_0$) in total of first and second ion exchange resin towers 31, 32 and the ratio of the amount of supply relative to the resin volume. The vertical axis of FIG. 21 represents each of the degree of Mo saturation ($C/C_0$) and the degree of W saturation ($C/C_0$), whereas the horizontal axis represents the ratio of the amount of supply relative to the resin volume. Further, the degree of W saturation ($C/C_0$) in the vertical axis of FIG. 21 indicates that W is discharged from second ion exchange resin tower 32 to result in loss of W. It should be noted that the degree of Mo saturation ($C/C_0$) in the vertical axis of FIG. 21 is the same as the degree of Mo saturation ($C/C_0$) in the vertical axis of FIG. 20.

Further, each of the SV and the amount of supply (amount of supply/resin volume) described above in example 4 is calculated assuming that the resin volume is 550 ml in one ion exchange resin tower.

After the experiment in example 4, first ion exchange resin tower 31 and second ion exchange resin tower 32 were disconnected from each other, and only first ion exchange resin tower 31 was supplied with a mixed aqueous solution of an ammonium chloride aqueous solution and an ammonia solution to perform elution treatment. As a result, it was confirmed that poly tungstate ions were adsorbed therein by 317% based on monomer handled as a unit (a ratio of the number of actually adsorbed tungsten atoms to the number of tungsten atoms assuming that all the mono tungstate ions are adsorbed in the adsorption-permitted site in the anion exchange resin). It was also confirmed that Mo was adsorbed at approximately 25 ppm (Mo mass/W mass (here, mass of "W" rather than the mass of "$WO_3$")).

Further, when only second ion exchange resin tower 32 disconnected as described above was supplied with a mixed aqueous solution of an ammonium chloride aqueous solution and ammonia solution to perform elution treatment, it was confirmed that poly tungstate ions were adsorbed therein by 223% based on monomer handled as a unit, and Mo was adsorbed at approximately 231 ppm (Mo mass/W mass (here, mass of "W" rather than the mass of "$WO_3$")).

From the result above, the following was confirmed. Of poly tungstate ions and Mo-containing polyacid ions presumably contained in the sodium tungstate aqueous solution having its pH of 6.5, the Mo-containing polyacid ions were gradually forced out to the downstream side of the ion exchange resin tower when the sample solution was continued to be supplied, because the Mo-containing polyacid ions are lower in affinity of ion exchange for the anion exchange resin than the poly tungstate ions. From the result described above, it was confirmed that a result similar to the above can be obtained also when the pH of the sample solution was in a range of at least not less than 3.5 and not more than 8, in particular, not less than 6 and not more than 7.

Example 5

A relation between each of the degree of Mo saturation ($C/C_0$) and the degree of W saturation ($C/C_0$) and the ratio of the amount of supply relative to the resin volume was examined in the same manner as in example 4, except that the supply velocity of the sample solution was set to a space velocity SV=1 $hr^{-1}$. A result thereof is shown in FIG. 22. FIG. 22 shows the degree of Mo saturation ($C/C_0$) and the degree of W saturation ($C/C_0$). The horizontal axis thereof represents the ratio of the amount of supply relative to the resin volume. Further, each of the SV and the amount of supply (amount of supply/resin volume) described above in example 5 is also calculated assuming that the resin volume is 550 ml in one ion exchange resin tower. Further, FIG. 22 shows a change of electric conductivity (mS/cm) of the discharged solution discharged from the ion exchange resin tower.

Then, the ion exchange resin tower after the above-described supply of solution was supplied with a mixed aqueous solution of an ammonium chloride aqueous solution and ammonia solution to perform elution treatment. The Mo concentration and W concentration in the discharged solution discharged from the ion exchange resin tower was measured in accordance with the ICP-AES. It was found that the Mo concentration in the discharged solution was 23 ppm (Mo mass/W mass (here, mass of "W" rather than the mass of "$WO_3$")). This indicates that the Mo removal ratio in example 5 (the Mo concentration remaining in first ion exchange resin tower 31/the Mo concentration of the sample solution; the same applies to the description below) was approximately 92%. From the W concentration in the discharged solution, it was confirmed that loss of W (mass of W discharged from second ion exchange resin tower 32 (here, mass of "W" rather than the mass of "$WO_3$" mass)/mass of all the W introduced into the ion exchange resin tower (here, mass of "W" rather than the mass of "$WO_3$"); the same applies to the description below) was approximately 3%. From the result described above, it was confirmed that a result similar to the above can be obtained also when the pH of the sample solution is in a range of at least not less than 3.5 and not more than 8, in particular, not less than 6 and not more than 7.

Example 6

In order to further reduce loss of W as compared with that in example 5, the sample solution was supplied in the same manner as in example 6, except that an amount of supply of the sample solution was 3.6 times as large as the resin volume.

Then, the ion exchange resin tower thus supplied with the above-described solution was then supplied with a mixed aqueous solution of an ammonium chloride aqueous solution and ammonia solution to perform elution treatment. The Mo concentration and W concentration in the discharged solution discharged from the ion exchange resin tower were measured in accordance with the ICP-AES. It was found that the Mo concentration in the discharged solution was 60 ppm (Mo mass/W mass (here, mass of "W" rather than the mass of "$WO_3$")). This indicates that the Mo removal ratio in example 6 was approximately 78%. From the W concentration in the discharged solution, it was confirmed that the loss of W was approximately 1%.

From the results shown in example 5 and example 6, it was confirmed that when removing Mo from the sodium tungstate aqueous solution containing poly tungstate ions with the use of two ion exchange resin towers each having a column filled with an anion exchange resin, a Mo removal ratio of 90% or greater is achieved with the loss of W being approximately 3%, and a Mo removal ratio of approximately 80% is achieved with the loss of W being approximately 1%. From the result described above, it was confirmed that a result similar to the above can be obtained also when the pH of the sample solution is in a range of at least not less than 3.5 and not more than 8, in particular, not less than 6 and not more than 7.

Example 7

Regarding the removal of V and Mo, an effect of changing the pH of each sodium tungstate aqueous solution was checked. This examination was performed in the following manner. That is, each of sodium tungstate aqueous solutions having W concentrations (g/L) and V concentrations (mg/L) as shown in Table 2 was adjusted by sulfuric acid to have a corresponding pH value shown in Table 2. Thereafter, this aqueous solution was supplied, at a space velocity of SV=20 $hr^{-1}$, to approximately 50 mL of a porous type strong base anion exchange resin (Cl type diaion PA308 (provided by Mitsubishi Chemical Corporation)). An amount of supply of the aqueous solution was twenty times as large as the resin volume thereof. Then, each of the W concentration and the V concentration in the discharged solution having passed through the porous type strong base anion exchange resin was measured in accordance with the ICP atomic emission spectroscopy method (ICP-AES). From a result of the measurement, a ratio (V/W ratio) of the V concentration to the W concentration (here, "W concentration" rather than "$WO_3$ concentration") in a discharged solution was determined. Results thereof are shown in Table 2.

TABLE 2

| | pH Value of Sodium Tungstate Aqueous Solution | Initial Concentration of W (g-$WO_3$/L) | V Concentration (ppm, V/W) | | | W Concentration (ppm, V/W) | | |
|---|---|---|---|---|---|---|---|---|
| | | | Before Treatment | After Treatment | Removal Ratio (%) | Before Treatment | After Treatment | Removal Ratio (%) |
| Sample 21 | 3.5 | 120 | 100 | 100 | 0 | 300 | 25 | 91.7 |
| Sample 22 | 4.5 | 120 | 100 | 100 | 0 | 300 | 24.9 | 91.7 |
| Sample 23 | 5.5 | 120 | 100 | 95 | 5 | 300 | 25.1 | 91.6 |
| Sample 24 | 6.5 | 120 | 100 | 89 | 11 | 300 | 23.6 | 92.1 |
| Sample 25 | 6.5 | 120 | 100 | 48 | 52 | 3000 | 254 | 91.5 |
| Sample 26 | 7.5 | 120 | 100 | 6.5 | 93.5 | 300 | 178 | 40.7 |
| Sample 27 | 8.0 | 120 | 100 | 7.2 | 92.8 | 300 | 234 | 22 |
| Sample 28 | 8.5 | 120 | 100 | 9.8 | 90.2 | 300 | 314 | −4.7 |

TABLE 2-continued

| | pH Value of Sodium Tungstate Aqueous Solution | Initial Concentration of W (g-WO$_3$/L) | V Concentration (ppm, V/W) | | | W Concentration (ppm, V/W) | | |
|---|---|---|---|---|---|---|---|---|
| | | | Before Treatment | After Treatment | Removal Ratio (%) | Before Treatment | After Treatment | Removal Ratio (%) |
| Sample 29 | 9.0 | 120 | 100 | 36 | 64 | 300 | 356 | −18.7 |
| Sample 30 | 2.0 | 120 | 100 | 100 | 0 | 300 | 262 | 12.7 |
| Sample 31 | 9.5 | 120 | 100 | 75 | 25 | 300 | 359 | −19.7 |
| Sample 32 | 10.0 | 120 | 100 | 100 | 0 | 300 | 361 | −20.3 |

As apparent from each of the results of samples 21 to 29 in Table 2, it was confirmed that V and/or Mo can be removed sufficiently by adjusting the pH of the sodium tungstate aqueous solution to fall within a range of 3.5 to 9.0. Further, when the pH of the aqueous solution is very low as in sample 30, W and Mo are likely to be formed into precipitates as $H_2WO_4$ and $H_2MoO_4$. This makes it difficult to separate W and Mo from each other. In sample 27, the Mo removal ratio was decreased. This is presumably because formation of poly tungstate ions was insufficient. In each of samples 28, 29, 31, and 32, the Mo removal ratio was negative in value. This is presumably due to the following reason. That is, the pH of the aqueous solution was increased to cause both W and Mo to change into mono acid, whereby the affinity of ion exchange of W and that of Mo were inversed with each other. Accordingly, Mo was enriched in first anion exchange resin 1 shown in FIG. 5(c).

From the result shown above, it is understood that the sodium tungstate aqueous solution having a pH of not less than 3.5 and not more than 9 provides an effect of removing V or Mo.

Heretofore, the embodiments and examples of the present invention have been illustrated, but it is possible to appropriately combine configurations of the embodiments and examples.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention can be used for a method for producing an ammonium tungstate aqueous solution.

REFERENCE SIGNS LIST

1: first anion exchange resin; 2: second anion exchange resin; 3: third anion exchange resin; 21: ion exchange resin tower; 31: first ion exchange resin tower; 32: second ion exchange resin tower.

The invention claimed is:

1. A method for producing an ammonium tungstate aqueous solution, comprising the steps of:
decreasing a pH of a solution containing tungstate ions and vanadate ions to not less than 7 and not more than 9 by using sulfuric acid to generate polyacid cluster ions of tungsten and vanadium;
bringing said solution having the pH decreased, into contact with an anion exchange resin;
eluting the vanadate ions from said anion exchange resin, by bringing said polyacid cluster ions of tungsten and vanadium adsorbed in said anion exchange resin into contact with a basic solution having a pH of 9 or higher to decompose said polyacid cluster ions of tungsten and vanadium into the tungstate ions and the vanadate ions;
eluting the tungstate ions remaining in said anion exchange resin with an aqueous solution after eluting the vanadate ions to obtain a discharged solution containing the tungstate ions;
adding sulfuric acid to said discharged solution containing the tungstate ions to generate poly tungstate ions;
bringing said discharged solution having said sulfuric acid added therein, into contact with said anion exchange resin;
bringing said anion exchange resin with which said discharged solution is brought into contact, into contact with an ammonia solution; and
recovering a solution discharged from said anion exchange resin in the step of bringing said anion exchange resin into contact with said ammonia solution.

2. The method for producing the ammonium tungstate aqueous solution according to claim 1, wherein said solution containing the tungstate ions and the vanadate ions has a tungsten oxide concentration of not less than 20 g/L and not more than 150 g/L, and has a vanadium concentration of not less than 15 mg/L and not more than 1000 mg/L.

3. The method for producing the ammonium tungstate aqueous solution according to claim 1, wherein in the step of bringing said solution having the pH decreased into contact with said anion exchange resin, said solution having the pH decreased is supplied to said anion exchange resin or said anion exchange resin is soaked in said solution having the pH decreased.

4. The method for producing the ammonium tungstate aqueous solution according to claim 1, wherein a ratio of a content of vanadium to a content of tungsten is $1 \times 10^{-4}$ or smaller in the solution containing the vanadium ions from said anion exchange resin with which said solution having the pH decreased is brought into contact.

5. The method for producing the ammonium tungstate aqueous solution according to claim 1, wherein said basic solution is a solution having a pH of 9 or greater and containing at least one selected from a group consisting of a sodium hydroxide aqueous solution, a potassium hydroxide aqueous solution, and ammonia solution.

6. The method for producing the ammonium tungstate aqueous solution according to claim 5, wherein the aqueous solution containing at least one selected from a group consisting of chloride ions, sulfate ions, and nitrate ions is brought into contact with said anion exchange resin after the contact with said basic solution.

7. A method for producing the ammonium tungstate aqueous solution, comprising the steps of:
producing a polyacid solution containing poly tungstate ions and Mo-containing polyacid ions;

adsorbing said poly tungstate ions to a first anion exchange resin tower of an anion exchange resin and adsorbing said Mo-containing polyacid ions to a second anion exchange resin tower of said anion exchange resin tower by supplying said polyacid solution to said anion exchange resin tower constituted of said first anion exchange resin and said second anion exchange resin connected to each other, such that said first anion exchange resin is first supplied with said polyacid solution;

disconnecting said first anion exchange resin and said second anion exchange resin from each other; and bringing an aqueous solution containing ammonium ions into contact with said first anion exchange resin after the step of disconnecting.

8. The method for producing the ammonium tungstate aqueous solution according to claim 7, wherein in the step of bringing said aqueous solution containing the ammonium ions into contact, an ammonia solution is brought into contact with the first anion exchange resin.

9. The method for producing the ammonium tungstate aqueous solution according to claim 7, wherein said polyacid solution has a pH of not less than 3.5 and not more than 8.

10. The method for producing the ammonium tungstate aqueous solution according to claim 8, comprising the step of bringing a solution containing at least one selected from a group consisting of chloride ions, nitrate ions, and sulfate ions, into contact with said first anion exchange resin after the step of bringing said ammonia solution into contact therewith.

11. The method for producing the ammonium tungstate aqueous solution according to claim 10, comprising the steps of:

obtaining a reconnected anion exchange resin by connecting said first anion exchange resin and said second anion exchange resin to each other, after the step of bringing said ammonia solution into contact with the first anion exchange resin, said second anion exchange resin being after the step of adsorbing said Mo-containing polyacid ions;

adsorbing said poly tungstate ions to said second anion exchange resin and adsorbing said Mo-containing polyacid ions to said first anion exchange resin by supplying said polyacid solution to said reconnected anion exchange resin such that said second anion exchange resin is first supplied with said polyacid solution; and bringing ammonia solution into contact with said second anion exchange resin.

12. A method for producing an ammonium tungstate aqueous solution, comprising the steps of:

producing a polyacid solution containing poly tungstate ions and Mo-containing polyacid ions;

adsorbing said poly tungstate ions to a first anion exchange resin of an anion exchange resin tower without adsorbing said Mo-containing polyacid ions thereto, by supplying said polyacid solution to said anion exchange resin tower constituted of said first anion exchange resin, a second anion exchange resin, and a third anion exchange resin connected to one another in this order, such that said first anion exchange resin is first supplied with said polyacid solution;

disconnecting said first anion exchange resin and said second anion exchange resin from each other; and bringing an ammonia solution into contact with said first anion exchange resin after the step of disconnecting.

13. The method for producing the ammonium tungstate aqueous solution according to claim 12, comprising the step of bringing a solution containing at least one selected from a group consisting of chloride ions, nitrate ions, and sulfate ions, into contact with said first anion exchange resin after the step of bringing said ammonia solution into contact therewith.

14. The method for producing the ammonium tungstate aqueous solution according to claim 13, comprising the steps of:

obtaining a reconnected anion exchange resin by connecting said second anion exchange resin, said third anion exchange resin, and said first anion exchange resin in this order, said second anion exchange resin being after the step of disconnecting, said third anion exchange resin being after the step of disconnecting, said first anion exchange resin being after the step of bringing said solution containing at least one selected from a group consisting of chloride ions, nitrate ions and sulfate ions into contact therewith;

adsorbing said poly tungstate ions to said second anion exchange resin without adsorbing said Mo-containing polyacid ions thereto, and adsorbing said Mo-containing polyacid ions to said first anion exchange resin, by supplying said polyacid solution to said reconnected anion exchange resin such that said second anion exchange resin is first supplied with said polyacid solution; and bringing an ammonia solution into contact with said second anion exchange resin.

* * * * *

UNITED STATES PATENT AND TRADEMARK OFFICE
CERTIFICATE OF CORRECTION

| | |
|---|---|
| PATENT NO. | : 8,974,674 B2 |
| APPLICATION NO. | : 13/582644 |
| DATED | : March 10, 2015 |
| INVENTOR(S) | : Ito et al. |

It is certified that error appears in the above-identified patent and that said Letters Patent is hereby corrected as shown below:

Drawings

Figure 16 did not print correctly. Please see the attached replacement sheet.

Signed and Sealed this
Sixth Day of October, 2015

Michelle K. Lee
*Director of the United States Patent and Trademark Office*